(12) United States Patent
Suk et al.

(10) Patent No.: US 10,725,789 B2
(45) Date of Patent: Jul. 28, 2020

(54) DATA GENERATION DEVICE FOR PARALLEL PROCESSING

(71) Applicant: ELECTRONICS AND TELECOMMUNICATIONS RESEARCH INSTITUTE, Daejeon (KR)

(72) Inventors: Jung Hee Suk, Daejeon (KR); Chun-Gi Lyuh, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 44 days.

(21) Appl. No.: 16/154,508

(22) Filed: Oct. 8, 2018

(65) Prior Publication Data

US 2019/0155610 A1 May 23, 2019

(30) Foreign Application Priority Data

Nov. 22, 2017 (KR) .................. 10-2017-0156827
Apr. 25, 2018 (KR) .................. 10-2018-0048133

(51) Int. Cl.
*G06F 9/38* (2018.01)
*G06F 3/06* (2006.01)
*G06F 15/80* (2006.01)

(52) U.S. Cl.
CPC .......... *G06F 9/3893* (2013.01); *G06F 3/0659* (2013.01); *G06F 9/3826* (2013.01); *G06F 15/8023* (2013.01)

(58) Field of Classification Search
None
See application file for complete search history.

(56) References Cited

U.S. PATENT DOCUMENTS

| 7,245,641 | B2* | 7/2007 | Kim ...................... H04L 49/30 |
| | | | 370/367 |
| 7,814,296 | B2 | 10/2010 | Lyuh et al. |
| 7,954,035 | B2* | 5/2011 | Chae .................. H03M 13/1177 |
| | | | 714/758 |
| 8,407,566 | B2* | 3/2013 | Hong ..................... H04N 19/67 |
| | | | 714/776 |
| 9,792,230 | B2 | 10/2017 | Choi et al. |
| 10,025,755 | B2* | 7/2018 | Saber ..................... G06F 17/15 |

(Continued)

FOREIGN PATENT DOCUMENTS

| KR | 10-2001-0026898 A | 4/2001 |
| KR | 10-2016-0005536 A1 | 1/2016 |
| KR | 10-2017-0005562 A | 1/2017 |

*Primary Examiner* — Henry Tsai
*Assistant Examiner* — Christopher A Bartels

(57) ABSTRACT

Provided is a data generation device for generating input data to be inputted to a parallel processing device. The data generation device includes: a controller configured to output padding data; and a data processing device configured to receive original data and to generate the input data in which at least a portion of the original data is padded with the padding data. The data processing device includes: a first multiplexer configured to receive the padding data and the original data; a register configured to store data outputted from the first multiplexer; and a second multiplexer configured to receive data outputted from the first multiplexer and data stored in the register.

17 Claims, 16 Drawing Sheets

(56) References Cited

U.S. PATENT DOCUMENTS

| | | |
|---|---|---|
| 10,338,919 B2 * | 7/2019 | Boswell .............. G06F 9/30014 |
| 2014/0019694 A1 | 1/2014 | Gulley et al. |
| 2015/0162925 A1 * | 6/2015 | Lee .................... H03M 1/1295 |
| | | 250/208.1 |
| 2015/0347914 A1 | 12/2015 | Kwon et al. |
| 2018/0189642 A1 * | 7/2018 | Boesch ................ G06F 17/505 |

\* cited by examiner

DATA GENERATION DEVICE FOR PARALLEL PROCESSING

CROSS-REFERENCE TO RELATED APPLICATIONS

This U.S. non-provisional patent application claims priority under 35 U.S.C. § 119 of Korean Patent Application No. 10-2017-0156827, filed on Nov. 22, 2017, and 10-2018-0048133 filed on Apr. 25, 2018, the entire contents of which are hereby incorporated by reference.

BACKGROUND

The present disclosure herein relates to an electronic device, and more particularly, to a data generation device for generating input data to be inputted to a parallel processing device.

The parallel processing device is a device for high-speed processing of high-volume data such as video, voice and text. The parallel processing device may be used in fields where high-speed data processing such as compression and restoration of data, recognition through machine learning, and artificial intelligence based on neural network is required. The parallel processing device may process an algorithm by configuring a plurality of memories, a processing element (PE), and so on for parallel processing. Data for parallel processing may be sequentially inputted to a parallel processing device or inputted in parallel through a plurality of memories.

Data processed with data compression and decompression and artificial intelligence algorithms generally have a dependency between data, and because of this, in the parallel processing operation, it may be necessary to reprocess the previously processed data or to process the values outside the boundaries of the original data by padding them with a special value.

Therefore, the parallel processing device must perform a complicated operation such as a memory access or an operation unit control for data processing.

SUMMARY

The present disclosure is to provide a data generation device for efficiently outputting data to be inputted to a parallel processing device.

An embodiment of the inventive concept provides a data generation device for generating input data to be inputted to a parallel processing device. The data generation device includes: a controller configured to output padding data; and a data processing device configured to receive original data and to generate the input data in which at least a portion of the original data is padded with the padding data. The data processing device includes: a first multiplexer configured to receive the padding data and the original data; a register configured to store data outputted from the first multiplexer; and a second multiplexer configured to receive data outputted from the first multiplexer and data stored in the register.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Below, in order for the inventive concept to be easily implemented by those skilled in the art, some embodiments will be described in detail and with reference to the accompanying drawings.

Figure 1:
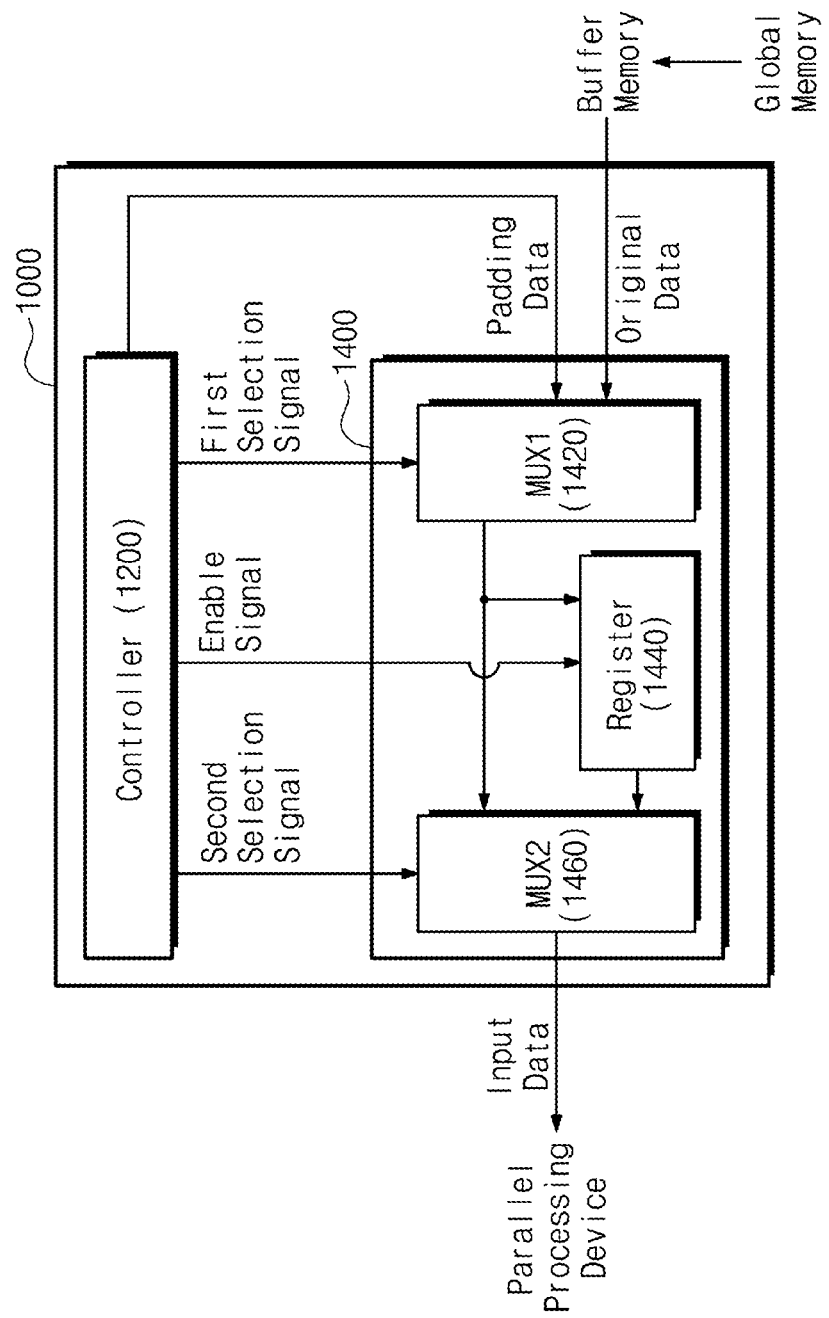
FIG. 1 shows a block diagram of a data generation device according to an embodiment.

FIG. 1 shows a block diagram of a data generation device according to an embodiment.

The data generation device 1000 may process the original data and generate input data to be inputted to the parallel processing device. According to an embodiment, the data generation device 1000 may receive the original data from the buffer memory and process the received original data to generate input data to be inputted to the parallel processing device.

The buffer memory may store the original data read from the global memory. According to an embodiment, the large amount of data may be stored in a global memory (e.g., DDR), and the data required in the current processing step may be transmitted to the buffer memory via the bus. The buffer memory according to an embodiment includes a dynamic random access memory (DRAM), a static random access memory (SRAM), a synchronous DRAM (SDRAM), a magnetic random access memory (MRAM), and a phase-change random access memory (PRAM) but is not limited thereto.

Referring to FIG. 1, a data generation device 1000 may include a controller 1200 and a data processing device 1400.

The controller 1200 may output a control signal for controlling the data processing device 1400. For example, the controller 1200 may output the first selection signal, the enable signal, the second selection signal, and padding data required for padding of the original data to the data processing device 1400. When the data processing device 1400 performs zero padding on the received original data, the controller 1200 may output '0' as padding data. According to an embodiment, the controller 1200 may be implemented with an ASIC, an embedded processor, a microprocessor, hardware control logic, a hardware finite state machine (FSM), or a combination thereof.

The data processing device 1400 may pad the original data read from the buffer memory located externally based on the padding data received from the controller 1200 and generate data to be inputted to the parallel processing device. The data outputted from the data processing device 1400 to the parallel processing device may be data in which a part of the original data is padded with a specific value or a value obtained by copying the original data. If padding is not required, the data outputted from the data processing device 1400 to the parallel processing device may be the original data itself received by the data processing device 1400.

The data processing device 1400 may sequentially read the original data stored in the buffer memory over a plurality of cycles. The control signal outputted by the controller 1200 may be independent of each other for each of a plurality of cycles. According to an embodiment, for each of a plurality of cycles, the data processing device 1400 reads the original data stored in a partial area of the buffer memory and processes the read original data based on the control signal outputted by the controller 1200 in the corresponding cycle.

More specifically, the data processing device 1400 may include a first multiplexer 1420, a register 1440, and a second multiplexer 1460.

The first multiplexer 1420 may receive at least one padding data received from the controller 1200 and at least one original data received from the buffer memory. The first multiplexer 1420 may output single data based on the first selection signal received from the controller 1200.

The data outputted from the first multiplexer 1420 may be transmitted to the second multiplexer 1460. In addition, the data outputted from the first multiplexer 1420 may also be stored in the register 1440 in accordance with an enable signal received from the controller 1200. The enable signal is a signal for enabling the register 1440. According to an embodiment, when the enable signal is '1', the data transmitted to the register 1440 may be stored in the register 1440 or the data stored in the register 1440 may be outputted.

The register 1440 may be used for a write back mode of the data generation device 1000 (a mode for storing the dependent data and transferring it to the input of the parallel processing device when needed later). The data stored in the register 1440 may be outputted to the parallel processing device in the cycle after the current cycle.

The second multiplexer 1460 receives the data outputted from the first multiplexer 1420 and the data stored in the register 1440. The second multiplexer 1460 may output single data to the parallel processing device based on the second selection signal received from the controller 1200. According to an embodiment, the data outputted from the second multiplexer 1460 may be inputted to one of the plurality of input channels of the parallel processing device.

The data processing device 1400 shown in FIG. 1 may represent a device for generating data to be inputted to one of a plurality of input channels of a parallel processing device. According to an embodiment, the parallel processing device may include a plurality of input channels, and the data generation device 1000 may include at least one additional data processing device for outputting data in parallel to a plurality of input channels.

According to an embodiment, the additional data processing device may be configured identically to the data processing device 1400 and may share control signals outputted from the controller 1200, but is not limited thereto.

The parallel processing device may be a processor composed of digital circuits and may include a plurality of operation units for performing an algorithm. The parallel processing device may perform a parallel processing algorithm based on the input data generated from the data generation device 1000. According to an embodiment, the parallel processing device may receive input data generated from the data generation device 1000 in parallel through a plurality of input channels, and may perform a parallel processing algorithm.

Figure 2:
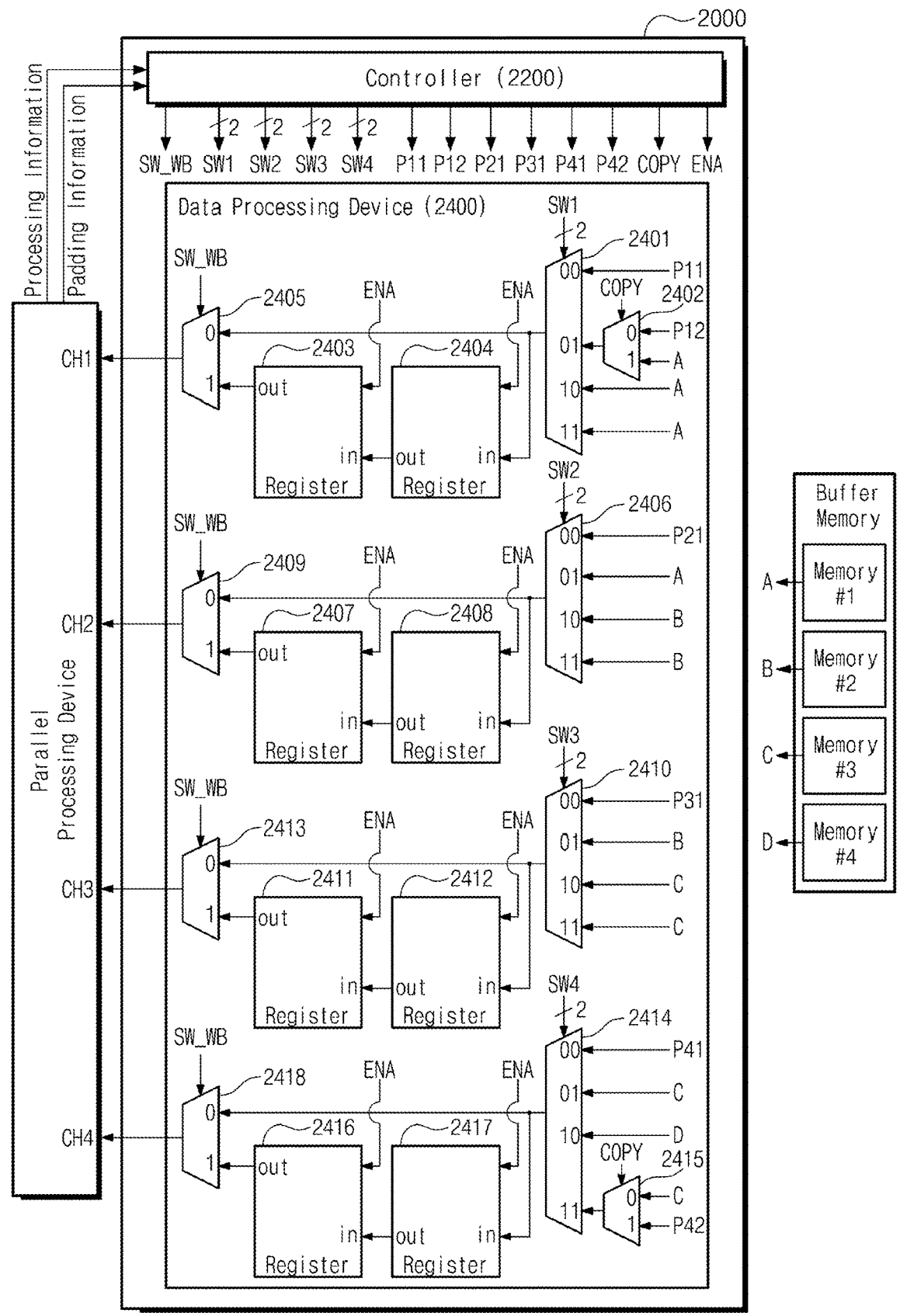
FIG. 2 shows a detailed configuration of a data generation device according to an embodiment.

FIG. 2 shows a detailed configuration of a data generation device according to an embodiment.

The data generation device 2000 of FIG. 2 represents a detailed configuration according to an embodiment of the data generation device 1000 of FIG. 1. The data generation device 2000 represents a device for generating four data inputted to four input channels (a first input channel CH1, a second input channel CH2, a third input channel CH3, and a fourth input channel CH4) of a parallel processing device. The generated four data is outputted in parallel to be inputted to a parallel processing device through the four input channels (a first input channel CH1, a second input channel CH2, a third input channel CH3, and a fourth input channel CH4), respectively. The data generation device 2000 is only one embodiment for implementing the data generation device 1000 of FIG. 1, and it is possible to change, delete or add components depending on the number of input channels or design changes of the parallel processing device.

The data generation device 2000 may correspond to the data generation device 1000 described above with reference to FIG. 1. The controller 2200 may correspond to the controller 1200 of FIG. 1 and the data processing device 2400 may correspond to the data processing device 1400 of FIG. 1. Therefore, even if there are omitted contents below, the contents described with respect to the controller 1200 and the data processing device 1400 of FIG. 1 may also be applied to the controller 2200 and the data processing device 2400 of FIG. 2.

The original data may be transmitted from the global memory to the buffer memory such as the memory #1 to the memory #4 through the bus as much as necessary for the current processing step.

The data processing device 2400 may sequentially read the original data from the buffer memory and process the original data read based on the padding data and the various control signals outputted from the controller 2200. The data processing device 2400 may transfer the processed original data through input channels (a first input channel CH1, a second input channel CH2, a third input channel CH3, and a fourth input channel CH4). The parallel processing device may perform a parallel processing algorithm based on the input data received from the data processing device 2400. According to one embodiment, the result of the parallel processing may be transmitted back to the buffer memory or to the global memory.

The parallel processing device may generate processing information (data size, memory location, memory partition information, current data information) and padding information while executing the algorithm. The generated processing information and padding information may be transmitted to the controller 2200. The controller 2200 according to an embodiment may determine padding data to be used in a subsequent cycle, based on the padding information received from the parallel processing device. However, if the value of the data to be padded is a predefined value (e.g., when the data processing device 2400 performs zero padding), the padding data may be generated directly within the controller 2200.

The data processing device 2400 includes multiplexers 2401, 2402, 2405, 2406, 2409, 2410, 2413, 2414, 2415, and 2418 and registers 2403, 2404, 2407, 2408, 2411, 2412, 2416, and 2417. However, the number of multiplexers and the number of registers may be changed according to design, but are not limited thereto.

The controller 2200 may output various control signals for controlling the multiplexers 2401, 2405, 2406, 2409, 2410, 2413, 2414, and 2418 in the data processing device 2400.

For example, the controller 2200 may output an enable signal ENA for enabling the registers 2403, 2404, 2407, 2408, 2411, 2412, 2416, and 2417. The registers 2403, 2404, 2407, 2408, 2411, 2412, 2416, and 2417 may store original data that may be used again in subsequent cycles of the original data processed in the current cycle. The original data stored in the registers 2403, 2404, 2407, 2408, 2411, 2412, 2416, and 2417 may be used when the data processing device 2400 generates data to be inputted to the parallel processing device in the cycle after the current cycle. When the enable signal ENA is '1', the value inputted to the register may be transmitted from the input terminal in to the output terminal out at the clock edge. The enable signal ENA may correspond to the enable signal of FIG. 1. Although FIG. 2 shows that there are two stages of registers per input channel, there may be one stage or several stages.

For example, the controller 2200 may output padding data P11, P12, P21, P31, P41, and P42 to be used for padding of original data. The padding data P11, P12, P21, P31, P41, and P42 may correspond to the padding data of FIG. 2. For example, when the data processing device 2400 performs zero padding on the original data, the controller 2200 may output the value of the padding data P11, P12, P21, P31, P41, and P42 as '0'.

For example, the controller 2200 may generate a data copy signal COPY used when performing padding by copying a value located at the boundary of original data.

For example, the controller 2200 generates selection signals SW1, SW2, SW3, and SW4 for selecting one of the data input to the multiplexers 2401, 2405, 2406, 2409, 2410, 2413, 2414, and 2418. The selection signals SW1, SW2, SW3, and SW4 may correspond to the first selection signal in FIG. 2.

The controller 2200 may generate a selection signal SW_WB for controlling the multiplexers 2405, 2409, 2413, and 2418 so that data may be appropriately transmitted in the write back mode. The selection signal SW_WB may correspond to the second selection signal in FIG. 2

Hereinafter, original data received by the data processing device 2400 from the memory #1, the memory #2, the memory #3, and the memory #4 will be referred to as A, B, C and D, respectively.

First, the operation of the data generation device 2000 for generating data transmitted to the first input channel CH1 of the parallel processing device will be described. The multiplexer 2401 receives the padding data P11, the data selectively outputted by the multiplexer 2402 among the padding data P12 and the original data A, and the original data A and A by each of the four input terminals. The multiplexer 2402 may selectively output one of the padding data P12 and the original data A according to the data copy signal COPY received by the controller 2200. The multiplexer 2401 may selectively output one of the four data received by the selection signal SW1 received by the controller 2200. The data outputted from the multiplexer 2401 may be transmitted to the multiplexer 2405. The data outputted from the multiplexer 2401 may also be transmitted to the register 2404 in accordance with an enable ENA signal received from the controller 2200. Depending on the selection signal SW_WB received from the controller 2200, the multiplexer 2405 may output one of the data received from the multiplexer 2401 and the data stored in the register 2403 to the first input channel CH1 of the parallel processing device.

The operation of the data generation device 2000 for generating data transmitted to the second input channel CH2 of the parallel processing device will be described. The multiplexer 2406 may receive padding data P21 and original data A, B, and B by each of the four input terminals. The multiplexer 2406 may selectively output one of the four data received according to the selection signal SW2 received by the controller 2200. The data outputted from the multiplexer 2406 may be transmitted to the multiplexer 2409. The data outputted from the multiplexer 2406 may also be transmitted to the register 2408 in accordance with an enable ENA signal received from the controller 2200. Depending on the selection signal SW_WB received from the controller 2200, the multiplexer 2409 may output one of the data received from the multiplexer 2406 and the data stored in the register 2407 to the second input channel CH2 of the parallel processing device.

The operation of the data generation device 2000 for generating data transmitted to the third input channel CH3 of the parallel processing device will be described. The multiplexer 2410 may receive padding data P31 and original data B, C, and C by each of the four input terminals. The multiplexer 2410 may selectively output one of the four data received according to the selection signal SW3 received by the controller 2200. The data outputted from the multiplexer 2410 may be transmitted to the multiplexer 2413. The data outputted from the multiplexer 2410 may also be transmitted to the register 2412 in accordance with an enable ENA signal received from the controller 2200. Depending on the selection signal SW_WB received from the controller 2200, the multiplexer 2413 may output one of the data received from the multiplexer 2410 and the data stored in the register 2411 to the third input channel CH3 of the parallel processing device.

Lastly, the operation of the data generation device 2000 for generating data transmitted to the fourth input channel CH4 of the parallel processing device will be described. The multiplexer 2414 may receive the padding data P41, the original data C and D, and the data selectively outputted by the multiplexer 2415 among, the original data C and the padding data P42 by each of the four input terminals. The multiplexer 2415 may selectively output one of the original data C and the padding data P42 according to the data copy signal COPY received by the controller 2200. The multiplexer 2414 may selectively output one of the four data received according to the selection signal SW4 received by the controller 2200. The data outputted from the multiplexer 2414 may be transmitted to the multiplexer 2418. The data outputted from the multiplexer 2414 may also be transmitted to the register 2417 in accordance with an enable ENA signal received from the controller 2200. Depending on the selection signal SW_WB received from the controller 2200, the multiplexer 2418 may output one of the data received from the multiplexer 2414 and the data stored in the register 2416 to the fourth input channel CH4 of the parallel processing device.

Hereinafter, referring to FIGS. 3 to 16, an operation of the data generation device 2000 to process the received original data according to various embodiments and to generate input data to be inputted to the parallel processing device will be described.

In various embodiments described below, it may be assumed that an image processor or a parallel processing device such as a Graphic Processing Unit (GPU) receives image data of 4×4 blocks and performs a parallel processing algorithm. In this case, the parallel processing device may desire image data (e.g., padding image data) processed to be suitable for parallel processing, rather than original image data, to perform the parallel processing algorithm. The data generation device 2000 may generate the padding image data to be inputted to the parallel processing device by processing the original image data based on the padding data received from the controller 2200 and various control signals.

Figure 3:
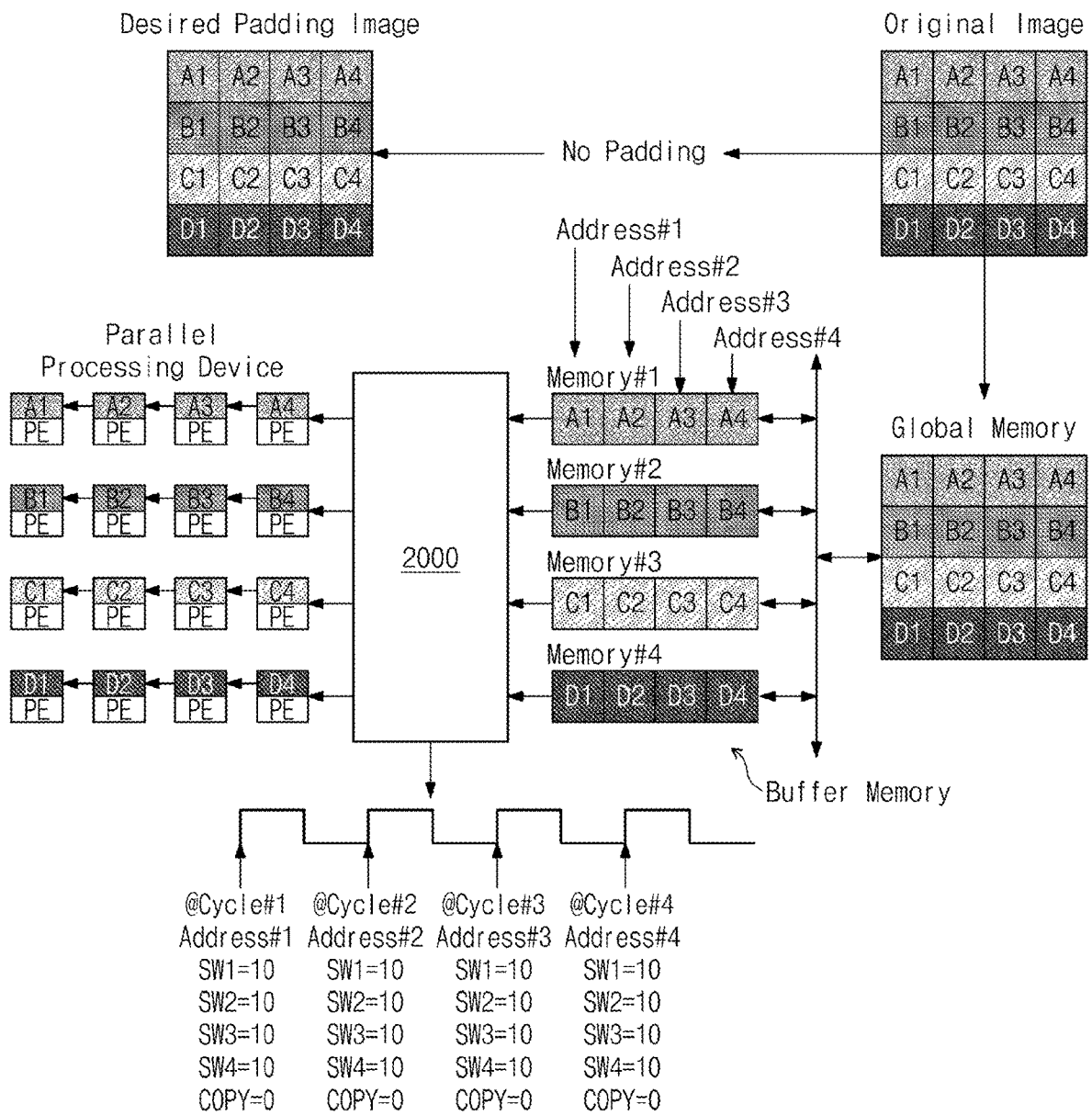
FIG. 3 is a diagram for explaining an operation of the data generation device of FIG. 2 when padding for original data is not required according to an embodiment.

FIG. 3 is a diagram for explaining an operation of the data generation device of FIG. 2 when padding for original data is not required according to an embodiment.

According to an embodiment, the original data A1, B1, C1, D1, A2, B2, C2, D2, A3, B3, C3, D3, A4, B4, C4, and D4 of the global memory may be transmitted to and stored in a buffer memory as they are. The original data may be stored in the area indicated by an address #1, an address #2, an address #3, and an address #4 of the buffer memory according to the order in which the original data are sequentially inputted to the buffer memory. Since the data generation device 2000 is not in the write back mode, both the selection signal SW_WB and the enable signal ENA may have a value of '0' (hereinafter, in the embodiments of FIGS. 3 to 14, the selection signal SW_WB and the enable signal ENA are both "0", and the write-back mode is described later with reference to FIGS. 15 and 16).

In cycle #1, the data generation device 2000 may read the original data A1, B1, C1, and D1 stored in the area indicated by the address #1 of the buffer memory. In cycle #1, the controller 2200 may output all of the selection signals SW1, SW2, SW3, and SW4 as '10' and output the data copy signal COPY as '0'. Since the padding data P11, P12, P21, P31, P41, and P42 does not affect data processing, any value may be used. The input data A1, B1, C1, and D1 generated by the data generation device 2000 may be transmitted to the input channels of the parallel processing device, respectively.

In cycle #2 to cycle #4, the data generation device 2000 may sequentially read the original data stored in the area indicated by the addresses #2 to #4 in the buffer memory, and process the original data based on the same control signal as in cycle #1. The processed data may be transmitted sequentially to the input channels of the parallel processing device.

When cycle #4 is completed, the parallel processing device may receive the desired input data and perform parallel processing on the input data.

Figure 4:
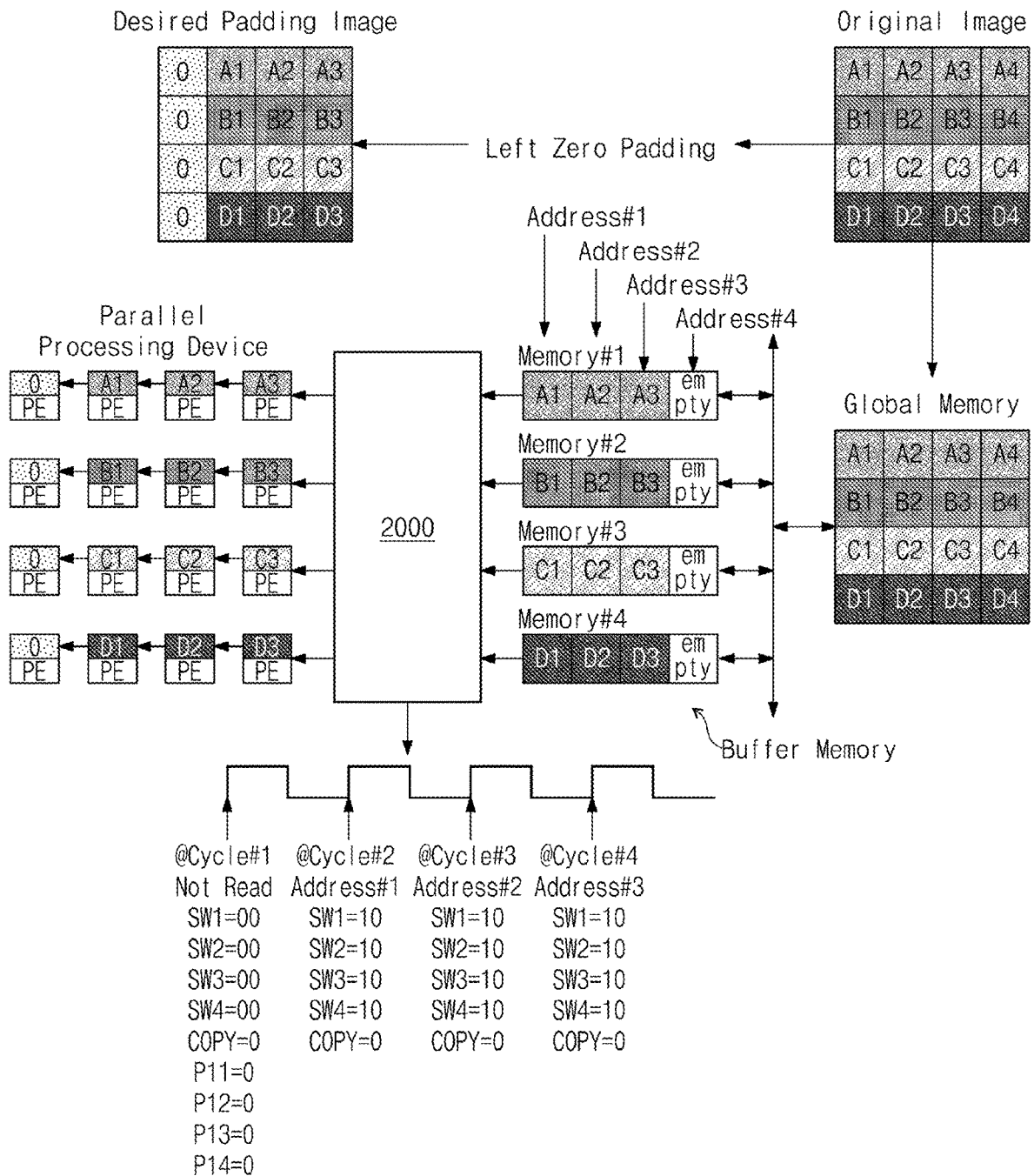
FIG. 4 is a diagram for explaining an operation of the data generation device of FIG. 2 when zero padding is required for the left boundary of original data according to an embodiment.

FIG. 4 is a diagram for explaining an operation of the data generation device of FIG. 2 when zero padding is required for the left boundary of original data according to an embodiment.

According to an embodiment, the original data A1, B1, C1, D1, A2, B2, C2, D2, A3, B3, C3, and D3 excluding the data padded with zeros is transmitted from the global memory to the buffer memory without any further remapping.

In cycle #1, the data generation device 2000 does not read the original data from the buffer memory. The controller 2200 outputs all of the selection signals SW1, SW2, SW3, and SW4 as '00', outputs the padding data P11, P21, P31, and P41 as '0', and outputs the data copy signal COPY as '0'. For example, the value of the padding data P12, P42 does not affect data processing, so any value may be used. The input data (four '0' values) generated by the data generation device 2000 may be transmitted to the input channels of the parallel processing device, respectively.

In cycle #2, the data generation device 2000 may read the original data A1, B1, C1, and D1 stored in the area indicated by the address #1 of the buffer memory. In cycle #2, the controller 2200 may output all of the selection signals SW1, SW2, SW3, and SW4 as '10' and output the data copy signal COPY as '0'. As in cycle #2, since the padding data P11, P12, P21, P31, P41, and P42 does not affect data processing, any value may be used. The input data A1, B1, C1, and D1 generated by the data generation device 2000 may be transmitted to the input channels of the parallel processing device, respectively.

In cycle #3 to cycle #4, the data generation device 2000 may sequentially read the original data stored in the area indicated by the addresses #2 to #3 of the buffer memory, and process the original data based on the same control signal as in cycle #2. The processed data may be transmitted sequentially to the input channels of the parallel processing device.

When cycle #4 is completed, the parallel processing device may receive the desired input data with the left boundary padded to zero, and perform parallel processing on the input data.

Figure 5:
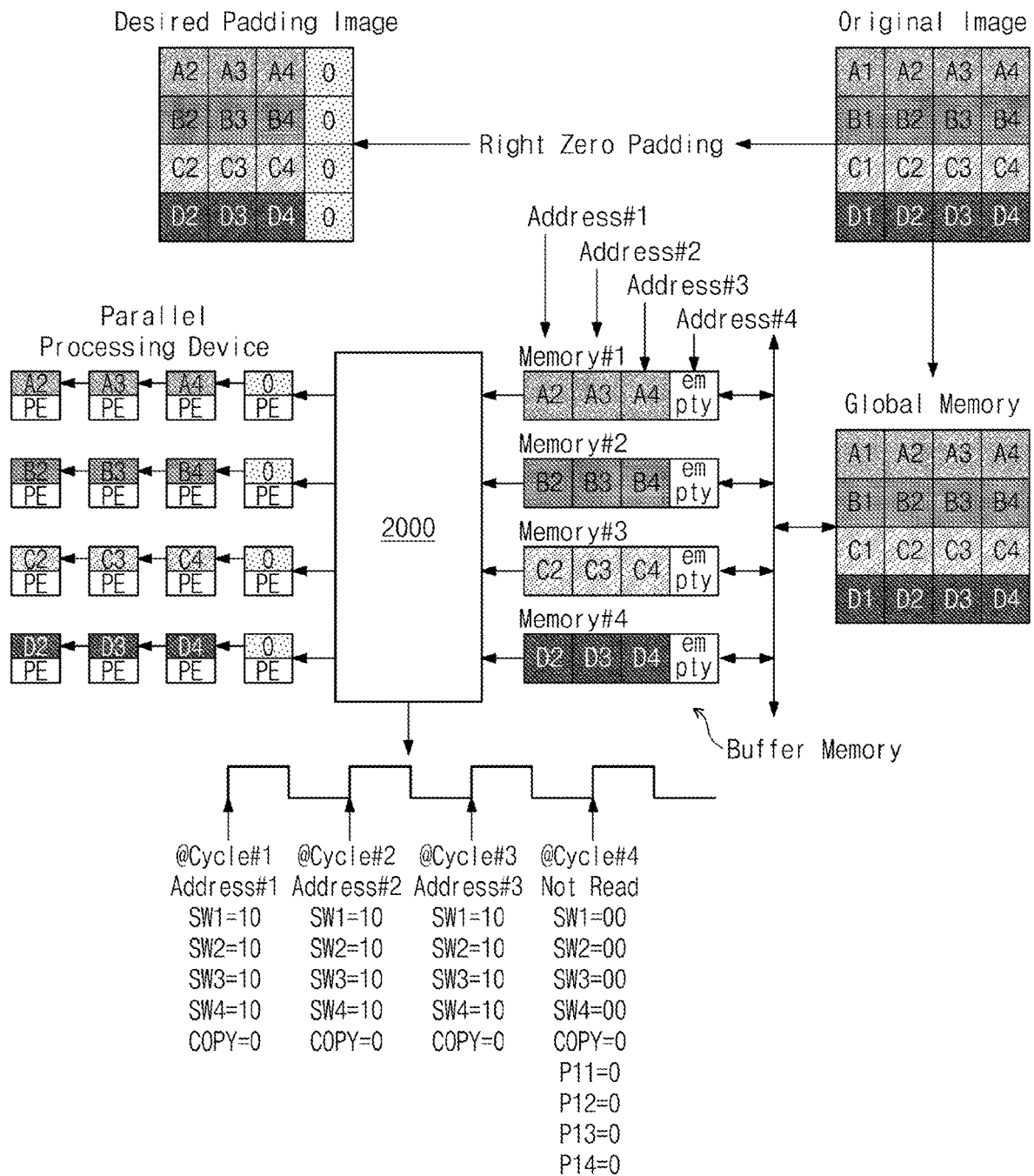
FIG. 5 is a diagram for explaining an operation of the data generation device of FIG. 2 when zero padding is required for the right boundary of original data according to an embodiment.

FIG. 5 is a diagram for explaining an operation of the data generation device of FIG. 2 when zero padding is required for the right boundary of original data according to an embodiment.

According to an embodiment, the original data A2, B2, C2, D2, A3, B3, C3, D3, A4, B4, C4, and D4 excluding data padded with zeros may be transmitted from the global memory to the buffer memory without any further remapping.

In cycle #1, the data generation device 2000 may read the original data A2, B2, C2, and D2 stored in the area indicated by the address #1 of the buffer memory. In cycle #1, the controller 2200 may output all of the selection signals SW1, SW2, SW3, and SW4 as '10' and output the signal COPY as '0'. Since the padding data P11, P12, P21, P31, P41, and P42 does not affect data processing, any value may be used. The input data A2, B2, C2, and D2 generated by the data generation device 2000 may be transmitted to the input channels of the parallel processing device, respectively.

In cycle #2 to cycle #3, the data generation device 2000 may sequentially read the original data stored in the area indicated by the addresses #2 to #3 of the buffer memory, and process the original data based on the same control signal as in cycle #1. The processed data may be transmitted sequentially to the input channels of the parallel processing device.

In cycle #4, the data generation device 2000 does not read the original data from the buffer memory, outputs all the control signals SW1, SW2, SW3, and SW4 as '00', outputs all the padding data P11, P21, P31, P41 as '0', and outputs the signal COPY as '0'. As in the previous cycle, any value may be used since the padding data P12 and P42 does not affect data processing. The input data (four '0' values) generated by the data generation device 2000 may be transmitted to the input channels of the parallel processing device, respectively.

When cycle #4 is completed, the parallel processing device may receive the desired input data with the right boundary padded to zero, and perform parallel processing on the input data.

Figure 6:
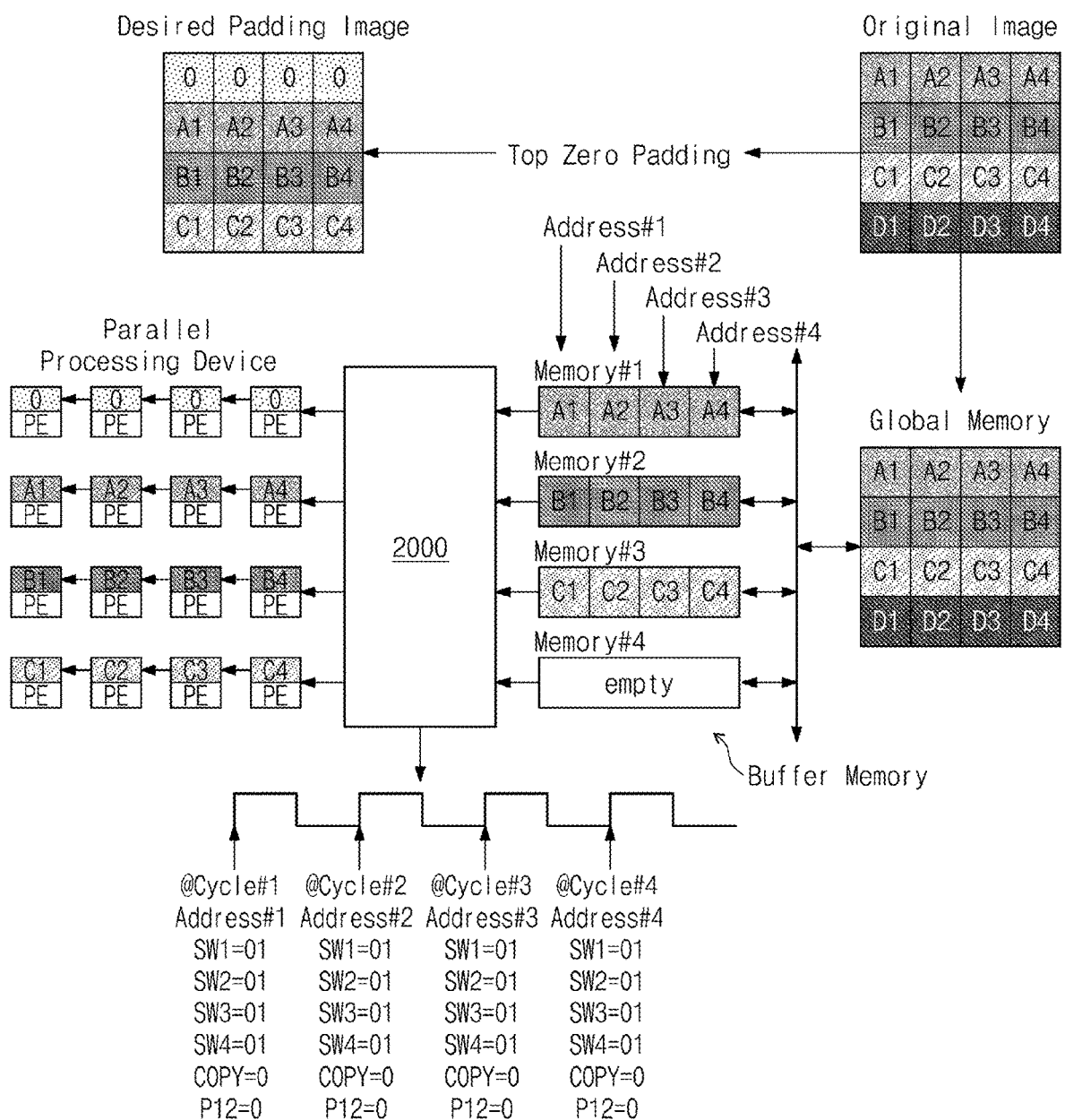
FIG. 6 is a diagram for explaining an operation of the data generation device of FIG. 2 when zero padding is required for the upper boundary of original data according to an embodiment.

FIG. 6 is a diagram for explaining an operation of the data generation device of FIG. 2 when zero padding is required for the upper boundary of original data according to an embodiment.

According to an embodiment, the original data A1, B1, C1, A2, B2, C2, A3, B3, C3, A4, B4, and C4 excluding the data padded with zeros is transmitted from the global memory to the buffer memory without any further remapping.

In cycle #1, the data generation device 2000 may read the original data A1, B1, and C1 stored in the area indicated by the address #1 of the buffer memory. The controller 2200 may output all the selection signals SW1, SW2, SW3 and SW4 as '01', output the padding data P12 as '0', and output the data copy signal COPY as '0' (the padding data P11, P21, P31, P41, and P42 does not affect the data processing and use any value). In the original data A1, B1, and C1, the upper boundary is padded by the data generation device 2000 and the input data 0, A1, B1, and C1 may be transmitted to the input channels of the parallel processing device by the data generation device 2000, respectively.

In cycle #2 to cycle #4, the data generation device 2000 may sequentially read the original data stored in the area indicated by the addresses #2 to #4 in the buffer memory, and process the read original data based on the same control signal as in cycle #1.

When cycle #4 is completed, the parallel processing device may receive the desired input data with the upper boundary padded to zero, and perform parallel processing on the input data.

Figure 7:
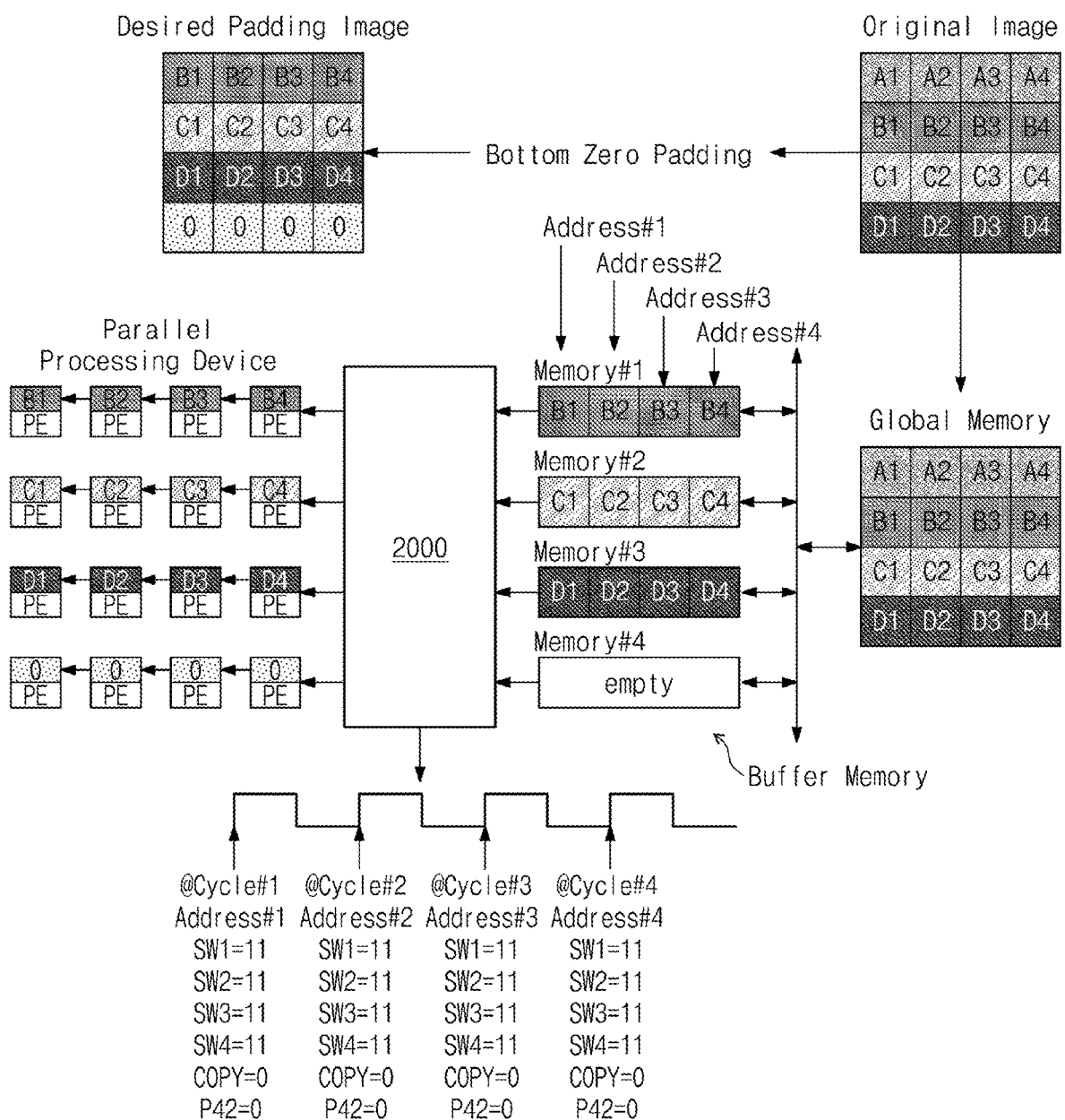
FIG. 7 is a diagram for explaining an operation of the data generation device of FIG. 2 when zero padding is required for the lower boundary of original data according to an embodiment.

FIG. 7 is a diagram for explaining an operation of the data generation device of FIG. 2 when zero padding is required for the lower boundary of original data according to an embodiment.

According to an embodiment, the original data B1, C1, D1, B2, C2, D2, B3, C3, D3, B4, C4, and D4 excluding data padded with zeros may be transmitted from the global memory to the buffer memory without any further remapping.

In cycle #1, the data generation device 2000 may read the original data B1, C1, and D1 stored in the area indicated by the address #1 of the buffer memory. In cycle #1, the controller 2200 may output all the selection signals SW1, SW2, SW3 and SW4 as '11', output the padding data P42 as '0', and output the data copy signal COPY as '0' (the padding data P11, P12, P21, P31, and P41 does not affect the data processing and use any value). In the original data B1, C1, and D1, the lower boundary is padded by the data generation device 2000 and the input data B1, C1, D1, and 0 may be transmitted to the input channels of the parallel processing device by the data generation device 2000, respectively.

In cycle #2 to cycle #4, the data generation device 2000 may sequentially read the original data stored in the area indicated by the addresses #2 to #4 in the buffer memory, and process the read original data based on the same control signal as in cycle #1.

When cycle #4 is completed, the parallel processing device may receive the desired input data with the lower boundary padded to zero, and perform parallel processing on the input data.

Figure 8:
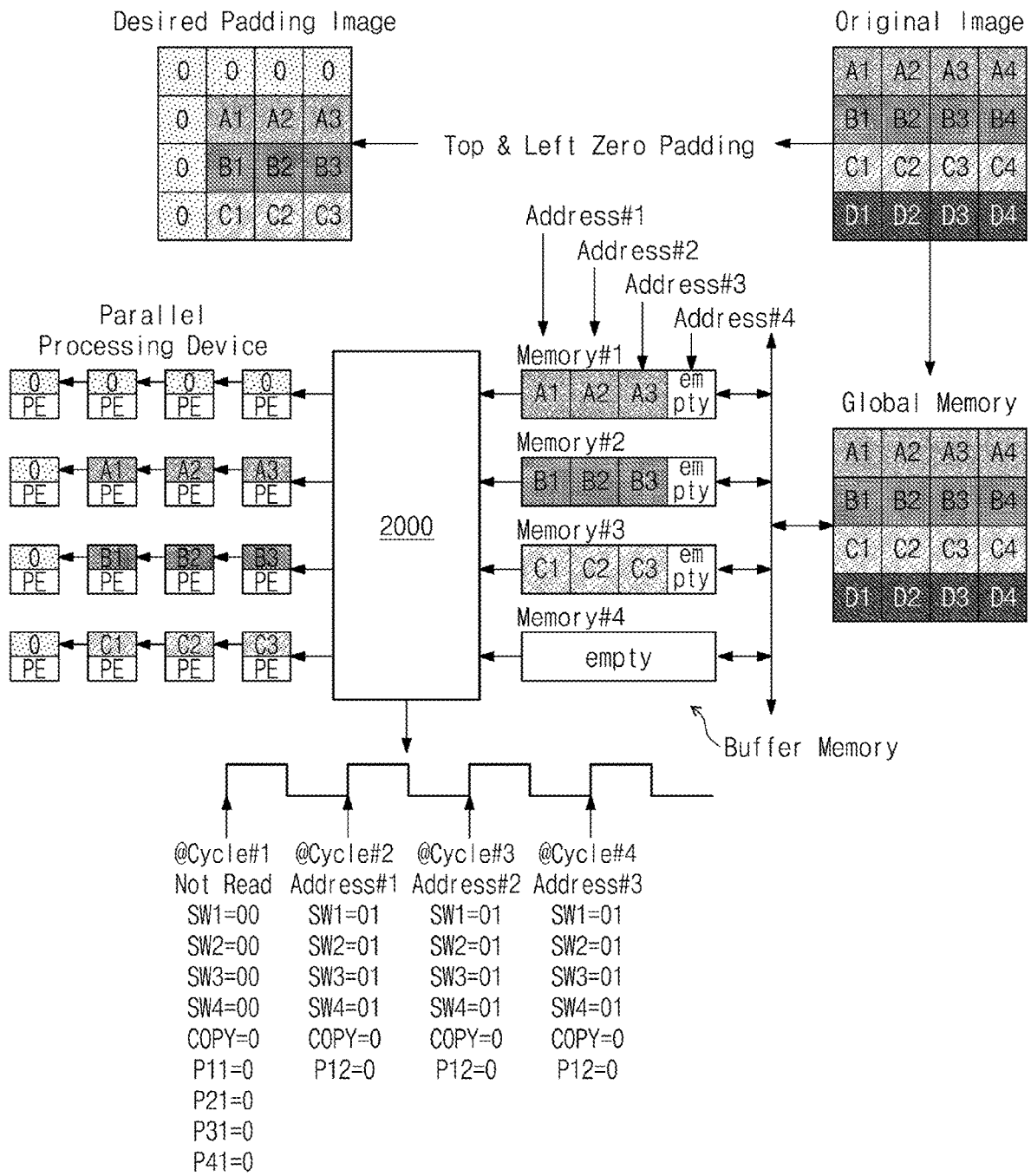
FIG. 8 is a diagram for explaining an operation of the data generation device of FIG. 2 when zero padding is required for the left and upper boundary of original data according to an embodiment.

FIG. 8 is a diagram for explaining an operation of the data generation device of FIG. 2 when zero padding is required for the left and upper boundary of original data according to an embodiment.

According to an embodiment, the original data A1, B1, C1, A2, B2, C2, A3, B3, and C3 excluding the data padded with zeros is transmitted from the global memory to the buffer memory without any further remapping.

In cycle #1, the data generation device 2000 does not read the original data from the buffer memory. The controller 2200 may output all of the selection signals SW1, SW2, SW3, and SW4 as '00', output all the padding data P11, P21, P31, and P41 as '0', and output the data copy signal COPY as '0' (the padding data P21 and P42 does not affect the data processing and use any value). The input data (four '0' values) generated by the data generation device 2000 may be transmitted to the input channels of the parallel processing device, respectively.

In cycle #2, the data generation device 2000 may read the original data A1, B1, and C1 from the area indicated by the address #1 of the buffer memory. The controller 2200 may output all the selection signals SW1, SW2, SW3 and SW4 as '01', output the padding data P12 as '0', and output the data copy signal COPY as '0' (the padding data P11, P21, P31, P41, and P42 does not affect the data processing and use any value). In the original data A1, B1, C1, the lower boundary is padded by the data generation device 2000 and the input data 0, A1, B1, and C1 may be transmitted to the input channels of the parallel processing device by the data generation device 2000, respectively.

In cycle #3 to cycle #4, the data generation device 2000 may sequentially read the original data from the area indicated by the addresses #2 to #3 of the buffer memory, and process the original data based on the same control signal as in cycle #2.

When cycle #4 is completed, the parallel processing device may receive the desired input data with the left and upper boundary padded to zero, and perform parallel processing on the input data.

Figure 9:
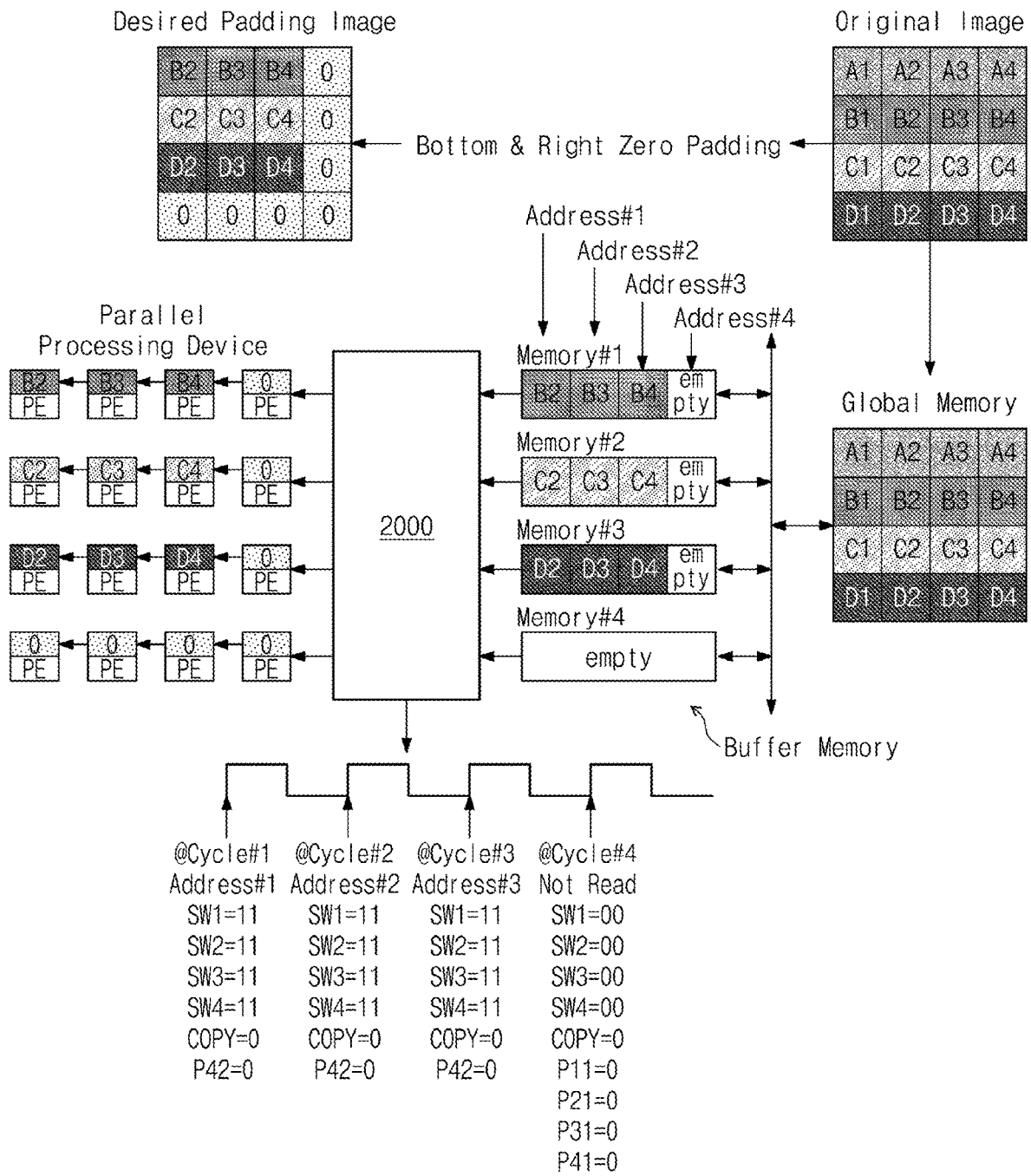
FIG. 9 is a diagram for explaining an operation of the data generation device of FIG. 2 when zero padding is required for the lower and right boundary of original data according to an embodiment.

FIG. 9 is a diagram for explaining an operation of the data generation device of FIG. 2 when zero padding is required for the lower and right boundary of original data according to an embodiment.

According to an embodiment, the original data B2, C2, D2, B3, C3, D3, B4, C4, and D4 excluding the data padded with zeros is transmitted from the global memory to the buffer memory without any further remapping.

In cycle #1, the data generation device 2000 may read the original data B2, C2, and D2 from the area indicated by the address #1 of the buffer memory. The controller 2200 may output all the selection signals SW1, SW2, SW3 and SW4 as '11', output the padding data P42 as '0', and output the data copy signal COPY as '0' (the padding data P11, P12, P21, P31, and P41 does not affect the data processing and use any value). The input data B2, C2, D2, and 0 generated by the data generation device 2000 may be transmitted to the input channels of the parallel processing device, respectively.

In cycle #2 to cycle #3, the data generation device 2000 may sequentially read the original data from the area indicated by the addresses #2 to #3 of the buffer memory, and process the read original data based on the same control signal as in cycle #1.

In cycle #4, the data generation device 2000 does not read the data from the buffer memory. The controller 2200 may output all of the selection signals SW1, SW2, SW3, and SW4 as '00', output all the padding data P11, P21, P31, and P41 as '0', and output the data copy signal COPY as '0' (the padding data P12 and P42 does not affect the data processing and use any value). The input data (four '0' values) generated by the data generation device 2000 may be transmitted to the input channels of the parallel processing device, respectively.

When cycle #4 is completed, the parallel processing device may receive the desired input data with the lower and right boundary padded to zero, and perform parallel processing on the input data.

Figure 10:
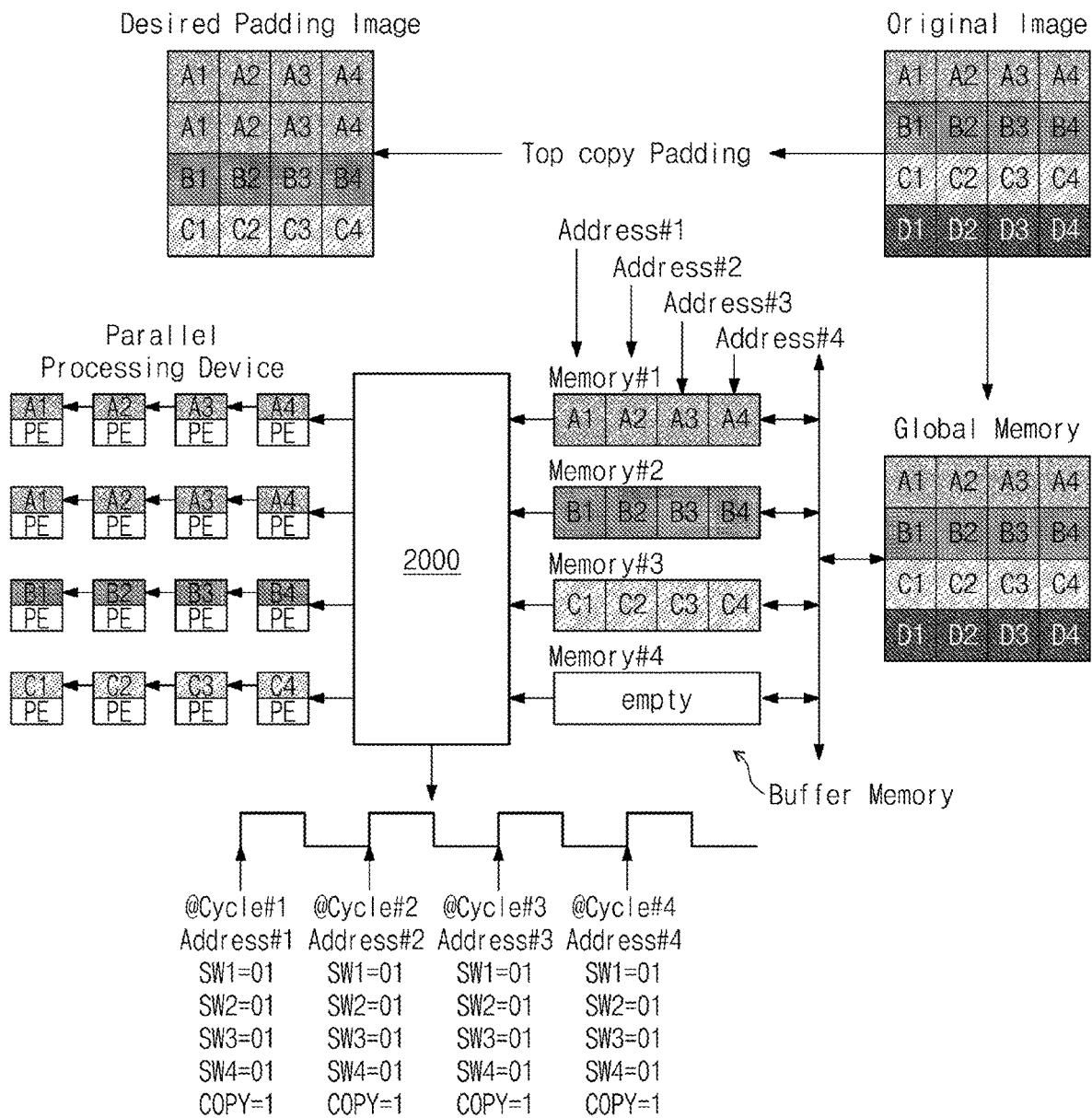
FIG. 10 is a diagram for explaining an operation of the data generation device of FIG. 2 when padding performed by copying data located at the upper boundary of original data is required according to an embodiment.

FIG. 10 is a diagram for explaining an operation of the data generation device of FIG. 2 when padding performed by copying data located at the upper boundary of original data is required according to an embodiment.

According to an embodiment, the original data A1, B1, C1, A2, B2, C2, A3, B3, C3, A4, B4, and C4 excluding the data padded with copied values is transmitted from the global memory to the buffer memory without any further remapping.

In cycle #1, the data generation device 2000 may read the original data A1, B1, and C1 from the area indicated by the address #1 of the buffer memory. The controller 2200 may output all the selection signals SW1, SW2, SW3 and SW4 as '01', and output the data copy signal COPY as '1' (the padding data P11, P12, P21, P31, P41, and P42 does not affect the data processing and use any value). Accordingly, the input data (copied value A1, and original values A1, B1, and C1) generated by the data generation device 2000 may be transmitted to the input channels of the parallel processing device, respectively.

In cycle #2 to cycle #4, the data generation device 2000 may sequentially read the original data from the area indicated by the addresses #2 to #4 in the buffer memory, and process the read original data based on the same control signal as in cycle #1.

When cycle #4 is completed, the parallel processing device may receive the desired padded input data by copying original data located at the upper boundary, and perform parallel processing on the input data.

Figure 11:
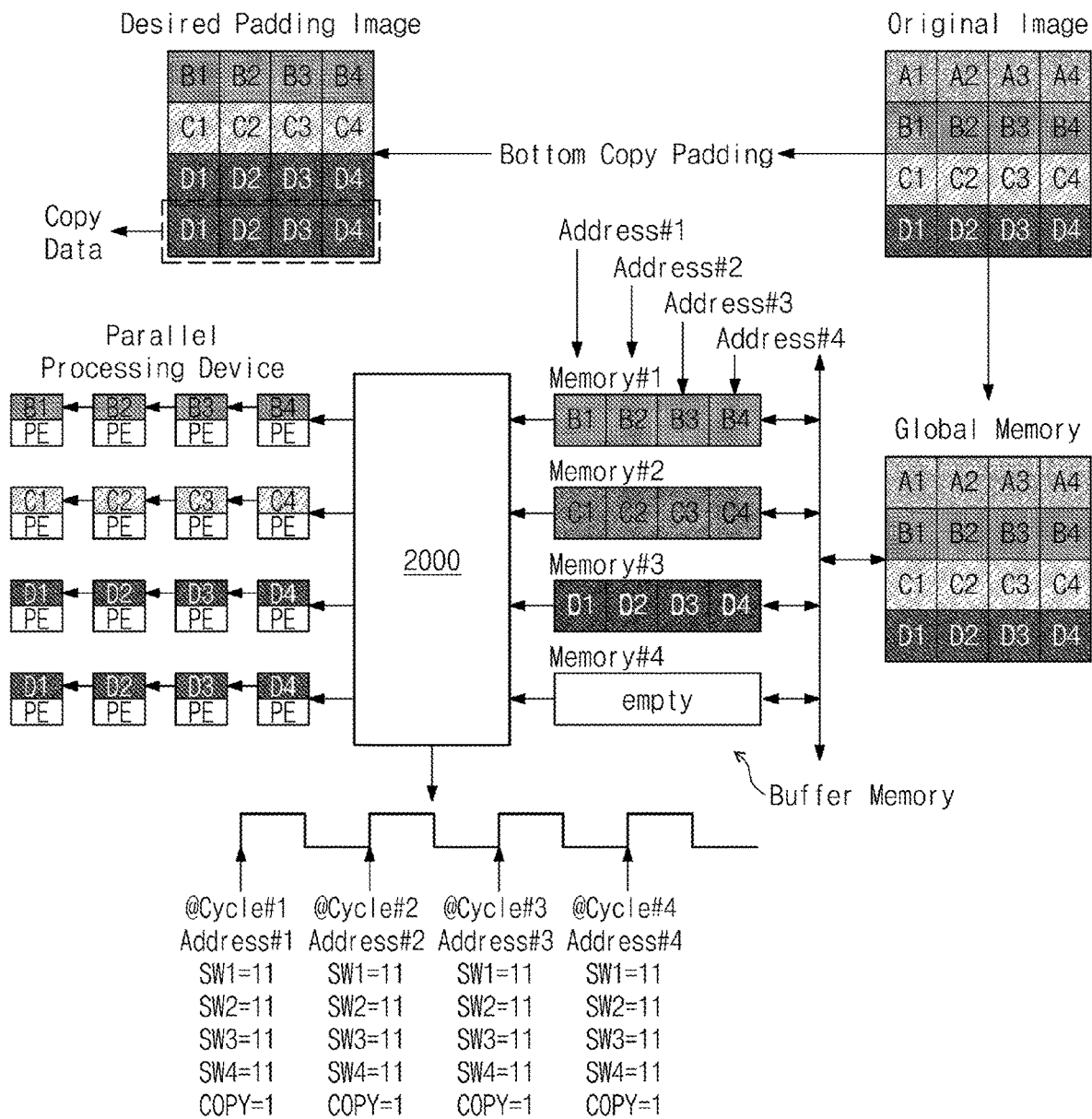
FIG. 11 is a diagram for explaining an operation of the data generation device of FIG. 2 when padding performed by copying data located at the lower boundary of original data is required according to an embodiment.

FIG. 11 is a diagram for explaining an operation of the data generation device of FIG. 2 when padding performed by copying data located at the lower boundary of original data is required according to an embodiment.

According to an embodiment, the original data B1, C1, D1, B2, C2, D2, B3, C3, D3, B4, C4, and D4 excluding data padded with copied values may be transmitted from the global memory to the buffer memory without any further remapping.

In cycle #1, the data generation device 2000 may read the original data B1, C1, and D1 from the area indicated by the address #1 of the buffer memory. The controller 2200 may output all the selection signals SW1, SW2, SW3 and SW4 as '11', and output the data copy signal COPY as '1' (the padding data P11, P12, P21, P31, P41, and P42 does not affect the data processing and use any value). Accordingly, the input data (B1, C1, original D1, and copied D1) generated by the data generation device 2000 may be transmitted to the input channels of the parallel processing device, respectively.

In cycle #2 to cycle #4, the data generation device 2000 may sequentially read the original data from the area indicated by the addresses #2 to #4 in the buffer memory, and process the read original data based on the same control signal as in cycle #1.

When cycle #4 is completed, the parallel processing device may receive the desired padded input data by copying original data located at the lower boundary, and perform parallel processing on the input data.

Figure 12:
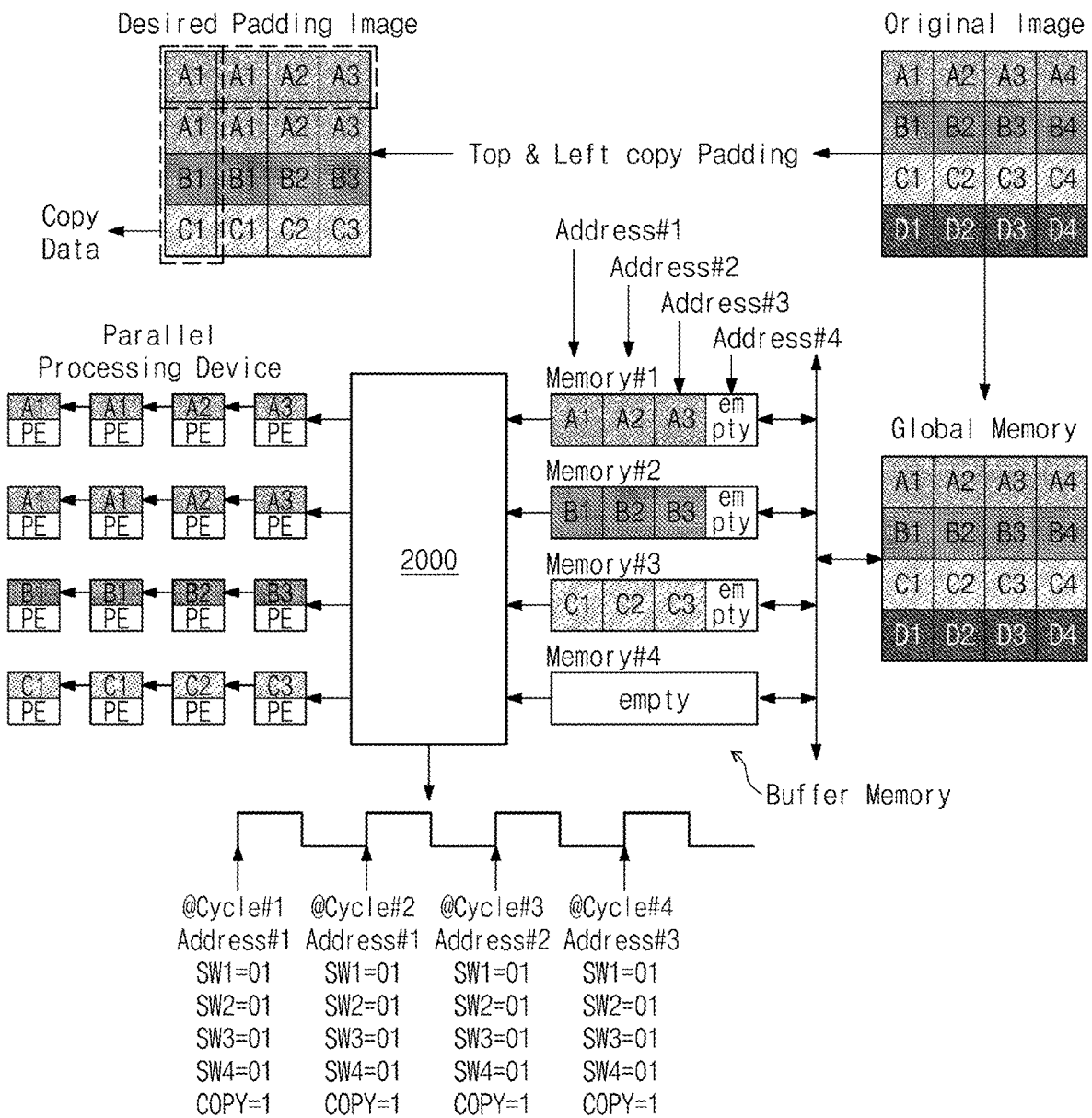
FIG. 12 is a diagram for explaining an operation of the data generation device of FIG. 2 when padding performed by copying data located at the left and upper boundary of original data is required according to an embodiment.

FIG. 12 is a diagram for explaining an operation of the data generation device of FIG. 2 when padding performed by copying data located at the left and upper boundary of original data is required according to an embodiment.

According to an embodiment, the original data A1, B1, C1, A2, B2, C2, A3, B3, and C3 excluding the data padded with copied values is transmitted from the global memory to the buffer memory without any further remapping.

In cycle #1, the data generation device 2000 may read the original data A1, B1, and C1 from the area indicated by the address #1 of the buffer memory. The controller 2200 may output all the selection signals SW1, SW2, SW3 and SW4 as '01', and output the data copy signal COPY as '1' (the padding data P11, P12, P21, P31, P41, and P42 does not affect the data processing and use any value). Accordingly, the input data (copied value A1, and original values A1, B1, and C1) generated by the data generation device 2000 may be transmitted to the input channels of the parallel processing device, respectively.

In cycle #2, the data generation device 2000 may re-read the original data A1, B1, and C1 in the area indicated by the address #1 of the buffer memory. The controller 2200 may output the same control signal as the cycle #1. That is, the data generation device 2000 may process the original data A1, B1, and C1 read based on the same control signal as in the cycle #1. Accordingly, the input data (copied value A1, and original values A1, B1, and C1) generated by the data generation device 2000 may be transmitted to the input channels of the parallel processing device, respectively.

In cycle #3 to cycle #4, the data generation device 2000 may sequentially read the original data from the area indicated by the addresses #2 to #3 of the buffer memory, and process the read original data based on the same control signal as in cycle #1.

When cycle #4 is completed, the parallel processing device may receive the desired padded input data by copying original data located at the left and upper boundary, and perform parallel processing on the input data.

Figure 13:
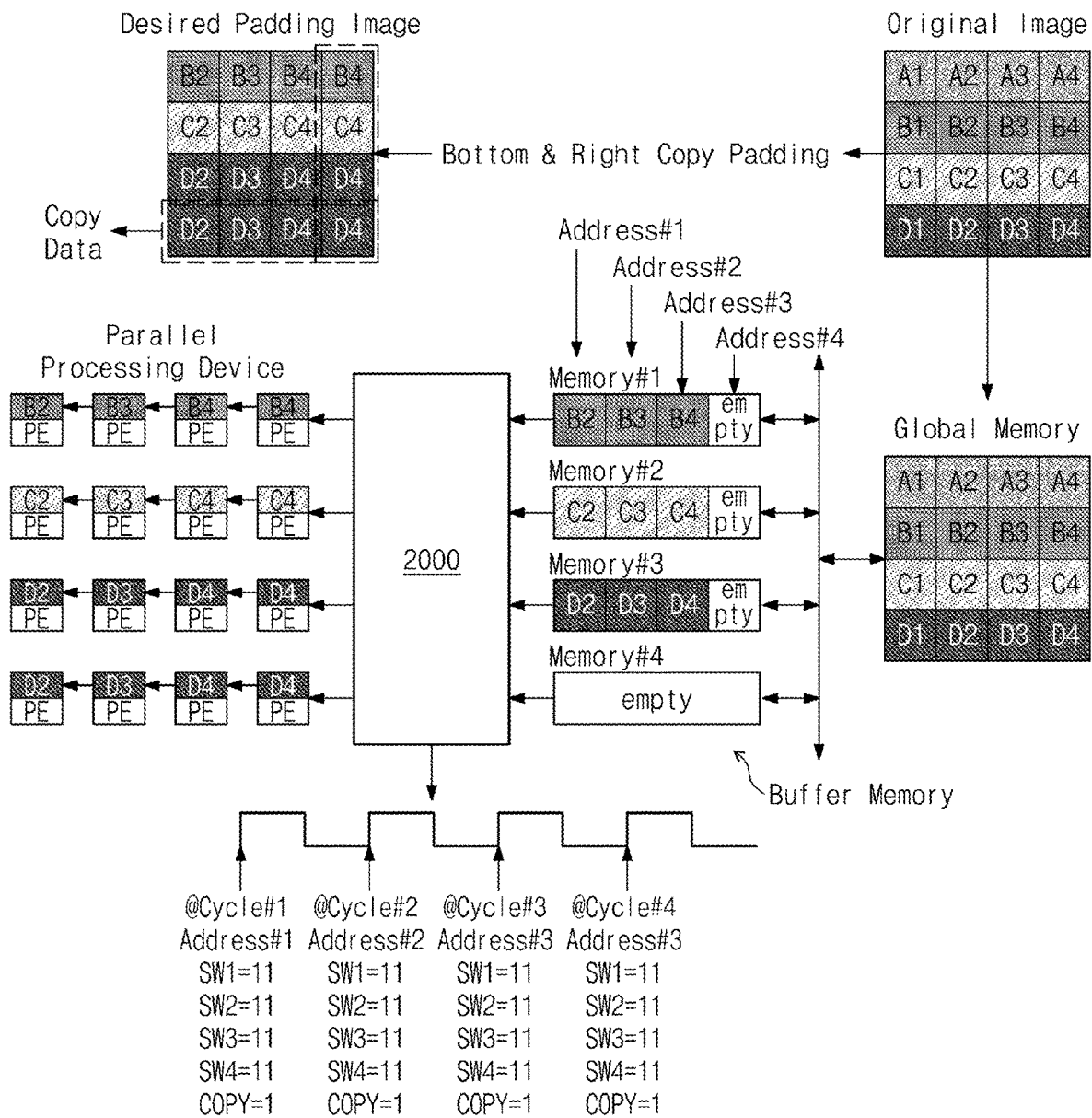
FIG. 13 is a diagram for explaining an operation of the data generation device of FIG. 2 when padding performed by copying data located at the right and lower boundary of original data is required according to an embodiment.

FIG. 13 is a diagram for explaining an operation of the data generation device of FIG. 2 when padding performed by copying data located at the right and lower boundary of original data is required according to an embodiment.

According to an embodiment, the original data B2, C2, D2, B3, C3, D3, B4, C4, and D4 excluding the data padded with copied values is transmitted from the global memory to the buffer memory without any further remapping.

In cycle #1, the data generation device 2000 may read the original data B2, C2, and D2 from the area indicated by the address #1 of the buffer memory. The controller 2200 may output all the selection signals SW1, SW2, SW3 and SW4 as '11', and output the data copy signal COPY as '1' (the padding data P11, P12, P21, P31, P41, and P42 does not affect the data processing and use any value). Accordingly, the input data (B2, C2, original D2, and copied D2) generated by the data generation device 2000 may be transmitted to the input channels of the parallel processing device, respectively.

In cycle #2, the data generation device 2000 may read the original data B3, C3, and D3 from the area indicated by the address #2 of the buffer memory, and process the original data B3, C3, and D3 based on the same control signal as in cycle #1. Accordingly, the input data (B3, C3, original D3, and copied D3) generated by the data generation device 2000 may be transmitted to the input channels of the parallel processing device, respectively.

In cycle #3, the data generation device 2000 may read the original data B4, C4, and D4 of the area indicated by the address #3 of the buffer memory, and process the original data B4, C4, and D4 based on the same control signal as in cycle #1. Accordingly, the input data (B4, C4, original D4, and copied D4) generated by the data generation device 2000 may be transmitted to the input channels of the parallel processing device, respectively.

In cycle #4, the data generation device 2000 may re-read the original data B4, C4, and D4 of the area indicated by the address #3 of the buffer memory, and process the original data based on the same control signal as in cycle #1. Accordingly, the input data (B4, C4, original D4, and copied D4) generated by the data generation device 2000 may be transmitted to the input channels of the parallel processing device, respectively.

When cycle #4 is completed, the parallel processing device may receive the desired padded input data by copying original data located at the right and lower boundary, and perform parallel processing on the input data.

Figure 14:
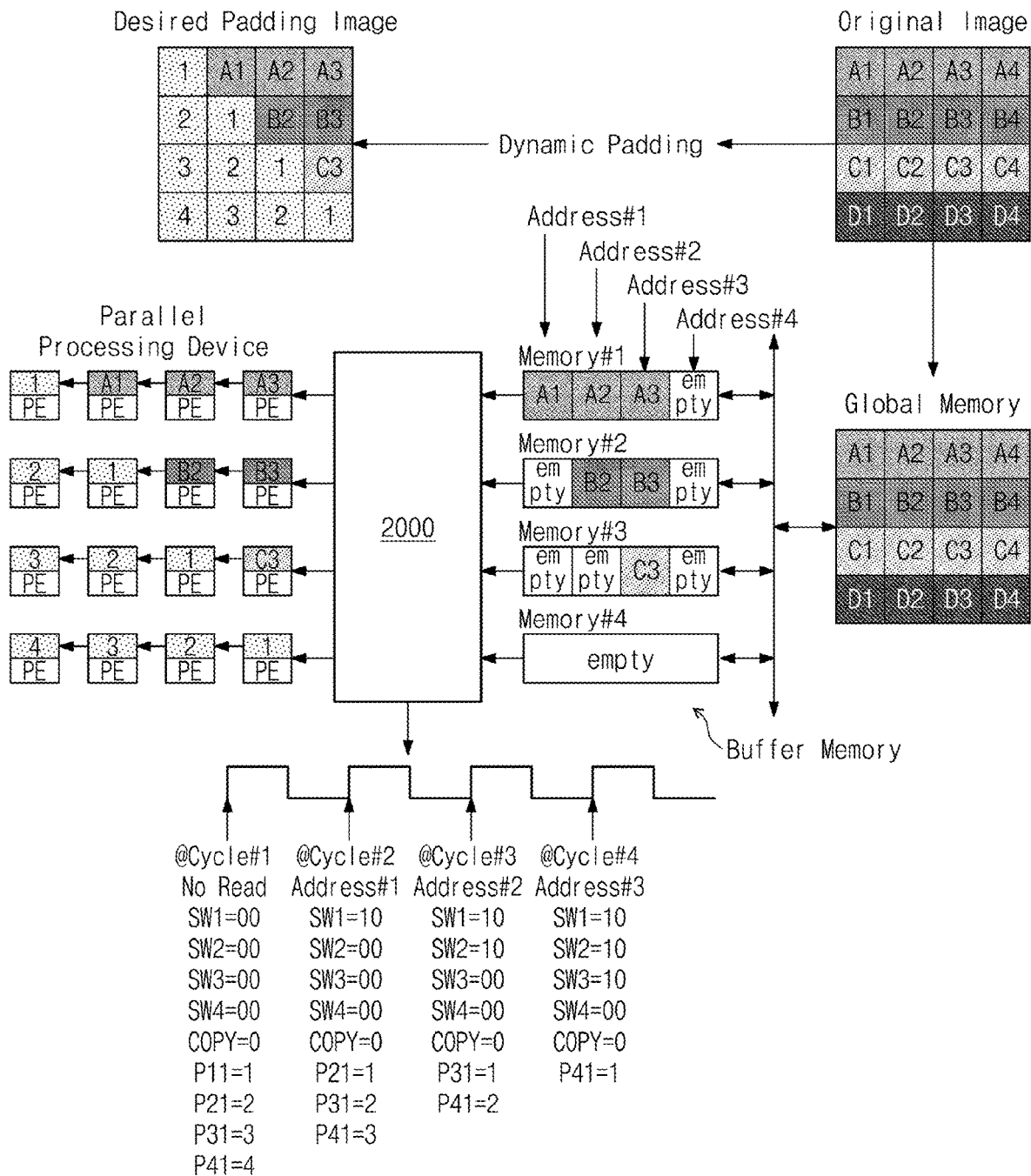
FIG. 14 is a diagram for explaining an operation of the data generation device of FIG. 2 when padding is required in an arbitrary form with respect to original data according to an embodiment.

FIG. 14 is a diagram for explaining an operation of the data generation device of FIG. 2 when padding is required in an arbitrary form with respect to original data according to an embodiment.

According to an embodiment, the original data A1, A2, B2, A3, B3, and C3 excluding the data padded with copied values is transmitted from the global memory to the buffer memory without any further remapping.

In cycle #1, the data generation device 2000 does not read the original data from the buffer memory. The controller 2200 may output all of the selection signals SW1, SW2, SW3, and SW4 as '00', output the padding data (P11=1, P21=2, P31=3, P41=4), and output the data copy signal COPY as '0' (the padding data P12 and P42 does not affect the data processing and use any value). Accordingly, the input data 1, 2, 3, and 4 generated by the data generation device 2000 may be transmitted to the input channels of the parallel processing device, respectively.

In cycle #2, the data generation device 2000 may read the original data A1 from the area indicated by the address #1 of the buffer memory. The controller 2200 may output the selection signal SW1 as '10', output all of the selection signals SW2, SW3, and SW4 as '00', output the padding data (P21=1, P31=2, P41=3), and output the data copy signal COPY as '0' (the padding data P11, P12, and P42 does not affect the data processing and use any value). Accordingly, the input data A1, 1, 3, and 3 generated by the data generation device 2000 may be transmitted to the input channels of the parallel processing device, respectively.

In cycle #3, the data generation device 2000 may read the original data A2 and B2 from the area indicated by the address #2 of the buffer memory. The controller 2200 may output the selection signal SW1 and the selection signal SW2 as '10', output the selection signal SW3 and the selection signal SW4 as '00', output the padding data (P31=1, P41=2), and output the data copy signal COPY as '0' (the padding data P11, P12, P21, and P42 does not affect the data processing and use any value). Accordingly, the input data A2, B2, 1, and 2 generated by the data generation device 2000 may be transmitted to the input channels of the parallel processing device, respectively.

In cycle #4, the data generation device 2000 may read the original data A3, B3, and C3 from the area indicated by the address #3 of the buffer memory. The controller 2200 may output the selection signals SW1, SW2, and SW3 as '10', output the selection signal SW4 as '00', output the padding data (P41=1), and output the data copy signal COPY as '0' (the padding data P11, P12, P21, P31, and P42 does not affect the data processing and use any value). Accordingly, the input data A3, B3, C3, and 1 generated by the data generation device 2000 may be transmitted to the input channels of the parallel processing device, respectively.

When cycle #4 is completed, the parallel processing device may receive the padded input data in the desired form, and perform parallel processing on the input data.

Figure 15:
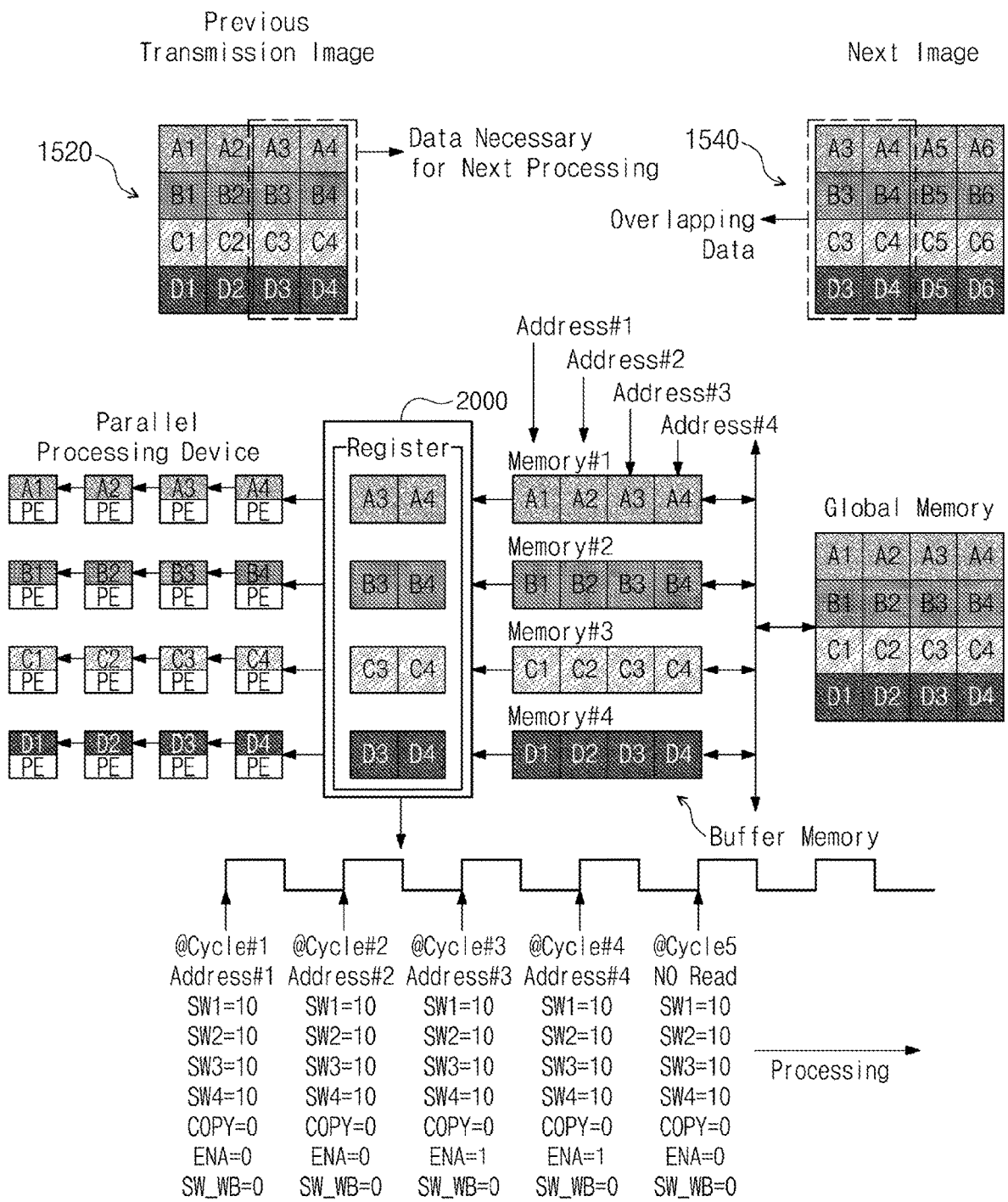
FIG. 15 is a diagram for explaining an operation of the data generation device of FIG. 2 in a write back mode according to an embodiment.
Figure 16:
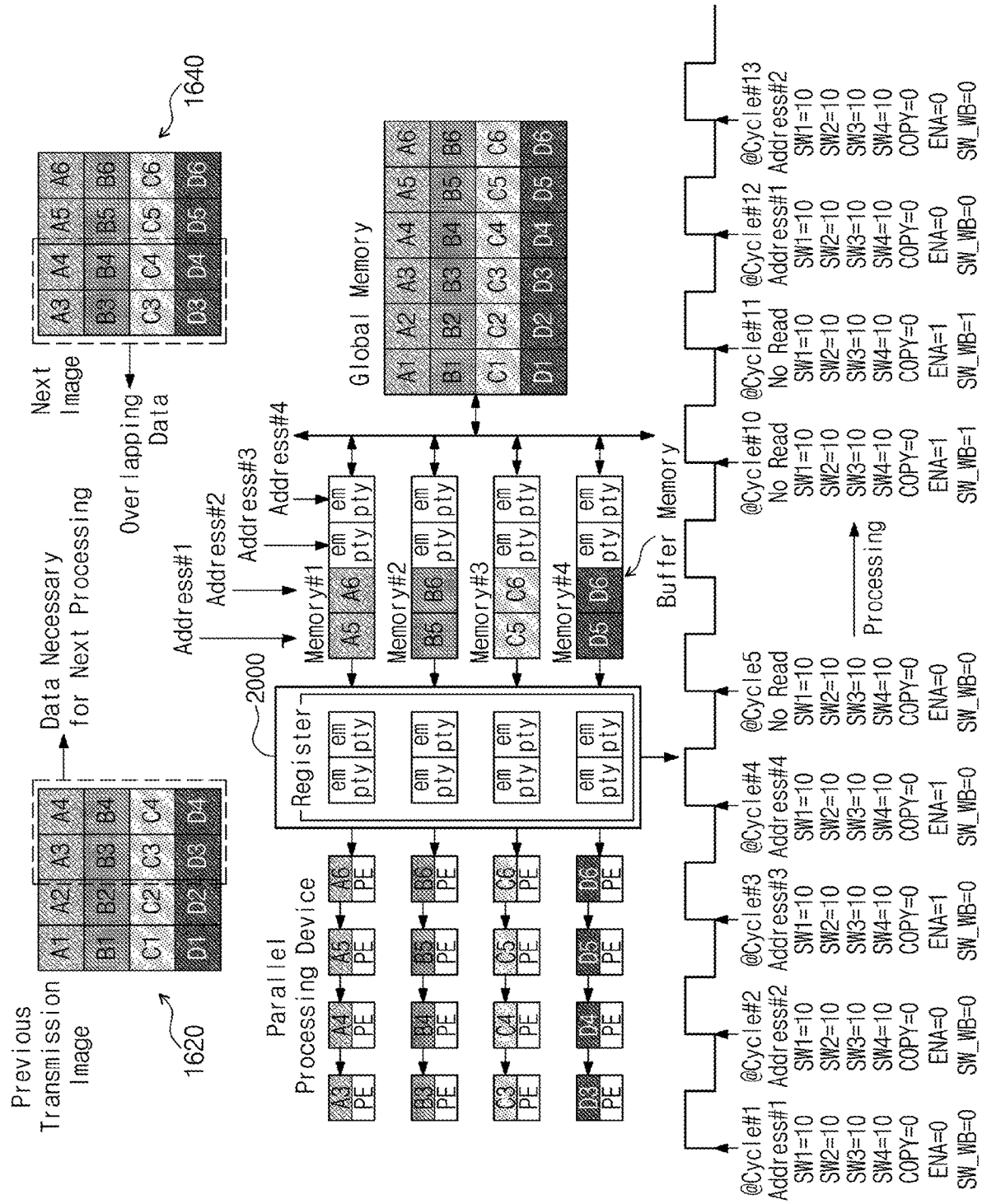
FIG. 16 is a diagram for explaining an operation of the data generation device of FIG. 2 of the next processing step when the current processing step in FIG. 15 is completed.

With reference to FIGS. 15 to 16 below, it is described that the data generation device 2000 stores in the register the original data having dependency which is used again in the next processing step among the original data received in the current processing step, and uses the original data stored in the register in the process of generating data to be inputted to the parallel processing device in the next processing step.

FIG. 15 is a diagram for explaining an operation of the data generation device of FIG. 2 in a write back mode according to an embodiment.

The data generation device 2000 according to one embodiment outputs the enable signal ENA as '1' and the selection signal SW_WB as '0' in the cycle where the original data with dependency is inputted to the data generation device 2000, so that the processed original data may be transmitted to the input channels of the parallel processing device and also may be stored in registers. According to one embodiment, if all of the data with dependencies is transmitted to the input channels, the data generation device 2000 outputs the enable signal ENA as '0' immediately so that the data having the dependency is stored in the register.

In order to transmit data with dependencies of previous processing steps to the parallel processing device again, in the next processing step, the data generation device 2000 outputs the selection signal SW_WB as '1' and the enable signal ENA as '1' so that the data stored in the register may be transmitted to the input channels of the parallel processing device.

The present processing step may mean a step of receiving original data A1, B1, C1, D1, A2, B2, C2, D2, A3, B3, C3, D3, A4, B4, C4, and D4 and processing the received original data to generate data such as a block 1520. The data generation device 2000 may process the original data A1, B1, C1, D1, A2, B2, C2, D2, A3, B3, C3, D3, A4, B4, C4, and D4 through cycle #1 to cycle #5.

The data A3, B3, C3, D3, A4, B4, C4, and D4 having dependency among the received original data may be used again to generate data such as a block 1540 in the next processing step (described below with reference to FIG. 16). Therefore, the data generation device 2000 may store the original data A3, B3, C3, D3, A4, B4, C4, and D4 having dependency in the register in the current processing step.

In cycle #1, the data generation device 2000 may read the original data A1, B1, C1, and D1 stored in the area indicated by the address #1 of the buffer memory. The controller 2200 may output the selection signals SW1, SW2, SW3 and SW4 as '10', output the data copy signal COPY as '0', and output a value of the enable signal ENA as '0' (the padding data P11, P12, P21, P31, P41, and P42 does not affect the data processing and use any value). Accordingly, the input data A1, B1, C1, and D1 generated by the data generation device 2000 may be transmitted to the input channels of the parallel processing device, respectively.

In cycle #2, the data generation device 2000 may read the original data A2, B2, C2, and D2 of the area indicated by the address #2 of the buffer memory, and process the read original data based on the same control signal as in cycle #1. Accordingly, the input data A2, B2, C2, and D2 generated by the data generation device 2000 may be transmitted to the input channels of the parallel processing device, respectively.

In cycle #3, the data generation device 2000 may read the original data A3, B3, C3, and D3 stored in the area indicated by the address #3 of the buffer memory. The controller 2200 may change the enable signal ENA to '1' and output it so as to be stored in the register simultaneously while transmitting the original data A3, B3, C3, and D3 with dependency to the input channels of the parallel processing device. Accordingly, the original data A3, B3, C3, and D3 having the dependency may be stored in the register, and the input data A3, B3, C3, and D3 generated by the data generation device 2000 may be transmitted to the input channels of the parallel processing device, respectively.

In cycle #4, the data generation device 2000 may read the original data A4, B4, C4, and D4 stored in the area indicated by the address #4 of the buffer memory. The controller 2200 may maintain the enable signal ENA to '1' to be stored in the register simultaneously while transmitting the original data A4, B4, C4, and D4 with dependency to the input channels of the parallel processing device. Accordingly, the original data A4, B4, C4, and D4 having the dependency may be stored in the register, and the input data A4, B4, C4, and D4 generated by the data generation device 2000 may be transmitted to the input channels of the parallel processing device, respectively.

In cycle #5, the data generation device 2000 may change the enable signal ENA to '0' again so that the original data A3, B3, C3, D4, A4, B4, C4, and D4 with dependency is stored continuously. When cycle #5 is completed, the parallel processing device may receive the desired input data in the current step and perform parallel processing on the input data. In addition, the original data A3, B3, C3, D4, A4, B4, C4, and D4 with dependency may be stored in the register.

FIG. 16 is a diagram for explaining an operation of the data generation device of FIG. 2 of the next processing step when the current processing step in FIG. 15 is completed.

According to an embodiment, the original data A5, B5, C5, D5, A6, B6, C6, and D6 excluding the data with dependency is transmitted from the global memory to the buffer memory. It is assumed that the next processing step starts in cycle #10. The data A3, B3, C3, D4, A4, B4, C4, and D4 of the data of the previously generated block 1620 are stored in the current register.

In cycle #10, the data generation device 2000 does not read the original data from the buffer memory. The controller 2200 may output all of the selection signals SW1, SW2, SW3, and SW4 as '10', output the data copy signal COPY as '0', output the enable signal ENA as '1', and output the selection signal SW_WB as '1'. Accordingly, the original data A3, B3, C3, and D3 stored in the first stage of the register of FIG. 15 may be transmitted to the input channels of the parallel processing device, respectively.

In cycle #11, the data generation device 2000 does not read the original data from the buffer memory as in cycle #10, and generates data based on the same control signal as in cycle #10. Accordingly, the original data A4, B4, C4, and D4 stored in the second stage of the register may be transmitted to the input channels of the parallel processing device, respectively.

From cycle #12, the data generation device 2000 may read new original data from the buffer memory.

In cycle #12, the data generation device 2000 may read the original data A5, B5, C5, and D5 stored in the area indicated by the address #1 of the buffer memory. The controller 2200 may output all of the selection signals SW1, SW2, SW3, and SW4 as '10', output the data copy signal COPY as '0', output the enable signal ENA as '0', and output the selection signal SW_WB as '0'. Thus, unmodified original data A5, B5, C5, and D5 may be transmitted as input data to the input channels of the parallel processing device.

In cycle #13, the data generation device 2000 may read the original data A6, B6, C6, and D6 stored in the address #2 of the buffer memory. The controller 2200 may output all of the selection signals SW1, SW2, SW3, and SW4 as '10', output the data copy signal COPY as '0', output the enable signal ENA as '0', and output the selection signal SW_WB as '0'. Thus, unmodified original data A6, B6, C6, and D6 may be transmitted as input data to the input channels of the parallel processing device.

When cycle #13 is completed, the parallel processing device may receive the same input data as in the block 1640 and perform parallel processing on the input data. In addition, all the data stored in the register is outputted to the parallel processing device, so that it becomes empty.

The data generation device may efficiently output and provide padding data to be inputted to the parallel processing device. Accordingly, for padding of the input data, a parallel processing device does not need to perform complex operations such as storing and accessing memory or controlling an arithmetic unit.

Also, the data generation device according to an embodiment may store data having a dependency, which is used again in the next processing step among the data processed in the current processing step, in the register. The data stored in the register may be used again in the next processing step. Therefore, performance degradation caused by the parallel processing device receiving redundant data may be reduced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A data generation device for generating input data to be inputted to a parallel processing device, the data generation device comprising:

a controller configured to output first padding data, a first selection signal, and a second selection signal; and a first data processing device configured to receive original data and to generate the input data using the original data, wherein the first data processing device comprises:
- a first multiplexer configured to receive the first padding data and the original data and to select, based on the first selection signal, one of the first padding data and the original data as data to output;
- a register configured to store the data outputted from the first multiplexer; and
- a second multiplexer configured to receive the data outputted from the first multiplexer and the data stored in the register and to select, based on the second selection signal, one of the data outputted from the first multiplexer and the data stored in the register as the input data.

2. The data generation device of claim 1, wherein the data stored in the register is outputted as the input data in a cycle after a current cycle.

3. The data generation device of claim 1, wherein the original data is two-dimensional data, and
at least the portion of the original data comprises data located at a boundary of the two-dimensional data.

4. The data generation device of claim 1, wherein the first data processing device sequentially receives the original data from a buffer memory located externally over a plurality of cycles.

5. The data generation device of claim 1,
wherein the controller is further configured to output second padding data,
wherein the original data comprises first original data and second original data, and
wherein the first multiplexer is further configured to select, based on the first selection signal, one of the first padding data, the second padding data, the first original data, and the second original data as data to input.

6. The data generation device of claim 1, further comprising a second data processing device,
wherein the additional data processing device generates additional input data to be inputted to the parallel processing device by padding the original data received by the additional data processing device based on the first padding data.

7. The data generation device of claim 6, wherein the input data and the additional input data are inputted to the parallel processing device through a first input channel and a second input channel, respectively.

8. The data generation device of claim 1,
wherein the controller is further configured to output an enable signal; and
wherein the register is configured to store the data outputted from the first multiplexer when the enable signal is asserted, and to retain previously stored data when the enable signal is not asserted.

9. A data generation device for generating one or more input data signals to be inputted to a parallel processing device, the data generation device comprising:
a controller configured to output one or more input selection signals and one or more padding signals; and
a data processing device configured to receive one or more original data signals, the one or more input selection signals, and the one or more padding signals, and to output the one or more input data signals using one or more respective selected signals, the selected signals being respectively generated by selecting, for each input data signal according to a respective input selections signal of the one or more input selection signals, one of the one or more original data signals or one of the one or more padding signals,
wherein each of one or more original data signals comprises a respective sequence of original values; and
wherein the each of one or more input data signals comprises a respective sequence of input values.

10. The data generation device of claim 9, wherein the data processing device is further configured to output a first input data signal of the one or more input data signals by sequentially selecting, as a first selected signal of the one or more selected signals:
a first padding signal of the one or more padding signals, followed by
one or more sequential original values of a first original data signal of the one or more original data signals.

11. The data generation device of claim 10, wherein the data processing device is further configured to output a second input data signal of the one or more input data signals by sequentially selecting, as a second selected signal of the one or more selected signals:
a second padding signal of the one or more padding signals, followed by
one or more sequential original values of a second original data signal of the one or more original data signals.

12. The data generation device of claim 9, wherein the data processing device is further configured to output a first input data signal of the one or more input data signals by sequentially selecting, as a first selected signal of the one or more selected signals:
one or more sequential original values of a first original data signal of the one or more original data signals, followed by
a first padding signal of the one or more padding signals.

13. The data generation device of claim 9, wherein the data processing device is further configured to:
output a first input data signal of the one or more input data signals by selecting, as a first selected signal of the one or more selected signals, a first original data signal of the one or more original data signals; and
output a second input data signal of the one or more input data signals by selecting, as a second selected signal of the one or more selected signals, the first original data signal.

14. The data generation device of claim 9, wherein the data processing device is further configured to:
output a first input data signal by selecting, as a first selected signal of the one or more selected signals, one of the one or more original data signals; and
output a second input data signal by selecting, as a second selected signal of the one or more selected signals, one of the one or more padding signals.

15. The data generation device of claim 9,
wherein the controller is further configured to output an enable signal and an output selection signal; and
wherein the data processing device comprises one or more registers, and
wherein the data processing device is further configured to receive the enable signal and the output selection signal, and to output the one or more input data signals by:
respectively storing the one or more selected signals into the one or more registers when the enable signal is asserted, and
outputting the one or more input data signals by respectively selecting the one or more selected signals when the output selection signal has a first value, and respectively selecting outputs of the one or more registers when the output selection signal has a second value, wherein the output of each of the one or registers correspond to a value stored into that register in a previous cycle.

16. The data generation device of claim 15, wherein the data processing device is further configured to output a first input data signal of the one or more input data signals by sequentially selecting:

a first selected signal of the one or more selected signals; followed by one or more sequential original values of an output of a first register of the one or more registers, wherein the first register stores values of the first selected signal.

17. The data generation device of claim 15, wherein the data processing device is further configured to output a first input data signal of the one or more input data signals by sequentially selecting:

one or more sequential values of a first selected signal of the one or more selected signals; followed by an output of a first register of the one or more registers, wherein the first register stores values of the first selected signal.

* * * * *